(12) United States Patent
Goto et al.

(10) Patent No.: US 8,498,016 B2
(45) Date of Patent: Jul. 30, 2013

(54) IMAGE PROCESSING APPARATUS AND IMAGE PROCESSING METHOD

(75) Inventors: Fumihiro Goto, Kawasaki (JP); Tetsuya Suwa, Yokohama (JP); Fumitaka Goto, Tokyo (JP); Yusuke Hashii, Kawasaki (JP); Ayumi Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 12/057,461

(22) Filed: Mar. 28, 2008

(65) Prior Publication Data

US 2008/0239355 A1 Oct. 2, 2008

(30) Foreign Application Priority Data

Mar. 30, 2007 (JP) ................................. 2007-093552

(51) Int. Cl.
*G06F 15/00* (2006.01)
*G03F 3/08* (2006.01)
*G06K 9/00* (2006.01)

(52) U.S. Cl.
USPC ............................ 358/1.9; 358/518; 382/167

(58) Field of Classification Search
None
See application file for complete search history.

(56) References Cited

U.S. PATENT DOCUMENTS

| | | | |
|---|---|---|---|
| 5,920,646 A * | 7/1999 | Kamon ........................... | 382/173 |
| 6,388,674 B1 * | 5/2002 | Ito et al. ......................... | 345/590 |
| 7,009,734 B2 | 3/2006 | Suwa et al. ..................... | 358/1.9 |
| 7,016,530 B2 | 3/2006 | Saito et al. ..................... | 382/162 |
| 7,075,679 B2 | 7/2006 | Goto et al. ..................... | 358/3.01 |
| 7,230,742 B1 * | 6/2007 | Kuwata et al. ................ | 358/3.15 |
| 7,274,491 B2 | 9/2007 | Yamada et al. ............... | 358/3.06 |
| 2005/0280852 A1 * | 12/2005 | Namizuka ..................... | 358/1.9 |
| 2006/0082804 A1 * | 4/2006 | Hiramatsu .................... | 358/1.14 |
| 2006/0176528 A1 * | 8/2006 | Dalrymple et al. ........... | 358/518 |
| 2006/0232801 A1 * | 10/2006 | Hoshii ............................ | 358/1.9 |
| 2007/0030498 A1 | 2/2007 | Hori et al. ...................... | 358/1.9 |
| 2007/0030499 A1 | 2/2007 | Hori .............................. | 358/1.9 |
| 2007/0091337 A1 * | 4/2007 | Morovic ........................ | 358/1.9 |
| 2007/0279714 A1 * | 12/2007 | Higashikata et al. ......... | 358/518 |
| 2008/0002901 A1 | 1/2008 | Miyagi et al. ................. | 382/260 |
| 2008/0018939 A1 | 1/2008 | Yamada et al. ............... | 358/3.06 |

FOREIGN PATENT DOCUMENTS

| | | |
|---|---|---|
| JP | 10-13624 | 1/1998 |
| JP | 11-191871 | 7/1999 |
| JP | 2001-251513 A | 9/2001 |
| JP | 2002-218271 A | 8/2002 |

* cited by examiner

*Primary Examiner* — Barbara Reinier
(74) *Attorney, Agent, or Firm* — Fitzpatrick, Cella, Harper & Scinto

(57) ABSTRACT

Image data can be subjected to a smoothing processing to improve a color reproduction characteristic and an image free from a deteriorated gradation characteristic can be printed. Specifically, the smoothing processing improves the color reproduction characteristic. This smoothing processing may cause a color originally not having the lightness equal to or lower than blacking lightness to be converted to a color having lightness equal to or lower than the blacking lightness. To solve this, such a color is subjected to a gradation adjustment processing to convert the color to the color having the lightness higher than blacking lightness. A gamut mapping does not map such a color on a black point, thus preventing such a color from being broken by the blacking.

24 Claims, 19 Drawing Sheets

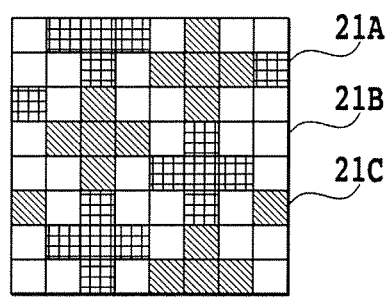
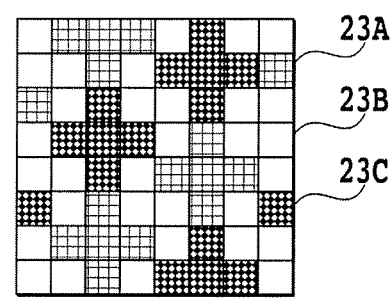
FIG.2A  FIG.2C
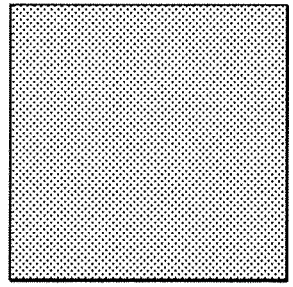
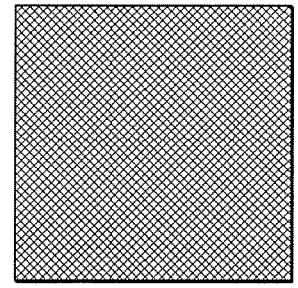
FIG.2B  FIG.2D

| y \ x | 0 | 1 | 2 | |
|---|---|---|---|---|
| 0 | +1 | -1 | +1 | |
| 1 | -1 | +1 | -1 | |
| 2 | +1 | -1 | +1 | |

IMAGE PROCESSING APPARATUS AND IMAGE PROCESSING METHOD

BACKGROUND OF THE INVENTION

1. Field of the Invention

The present invention relates to an image processing apparatus and an image processing method. In particular, the present invention relates to an application of a smoothing processing to an image and manner of the application.

2. Description of the Related Art

Recently, multi function machines including an ink jet print type printing mechanism and a scanner mechanism (hereinafter also referred to as IJMFP) have been widely provided. IJMFP is a printer that can be connected to a personal computer (PC) to provide various applications such as a function to perform printing and scanning, a copy function of the machine itself, and a function by which the machine is connected to a digital camera for direct printing. Thus, the multi function machines have been used as a copying machine for family use for example. The copy function of IJMFP reads a document image by a scanner mechanism to print the image on a printing medium such as a paper.

In the copying as described above, the color reproduction range and the like is generally different depending on the type of a document to be copied. Thus, there may be a case where the document and a copy output have difficulty in having identical visual colors. There may be another case where different gradation characteristics may be reproduced depending on the type of a document.

Difference in document is caused, for example, between when a print printed by a printer is copied and when a silver halide photograph is copied. Specifically, a printer performs a reproduction of an image by an area coverage modulation in which printing is performed on a printing medium based on quantized data to provide the print whose gradation is expressed by the area coverage modulation such as a halftone dot document. On the other hand, silver halide photography performs a reproduction of an image by a density modulation in which gradation is expressed by the density itself. If a read image is subjected to a uniform processing and printing is performed based on the uniform processing result regardless of whether the document is based on the area coverage modulation or the density modulation, a problem may be caused where how a base color changes or a color is reproduced is different depending on the type of a document.

To solve this problem, Japanese Patent Laid-Open No. 2001-251513 proposes a technique using image region segmentation. Specifically, this publication describes a method for segmenting a read image to at least a halftone dot region and a photo region and subjecting the respective regions to optimal γ conversions to provide favorable images in all regions. Also, Japanese Patent Laid-Open No. 2002-218271 describes a method for similarly segmenting a read image to a character region and a photograph region and subjecting the respective regions to optimal color space conversions to provide favorable images in all regions.

However, in the case of the above-described methods of Japanese Patent Laid-Open No. 2001-251513 and Japanese Patent Laid-Open No. 2002-218271, the respective regions subjected to the image region segmentation are subjected to optimal color conversions. Thus, for each of the segmented regions, a color design must be performed in accordance with the output characteristic of the printer. In this case, an accurate color reproduction requires increased types of regions subjected to the image region segmentation. For example, halftone dot regions require different output characteristics of the printer depending on the number of lines and a screen angle. Thus, regions must be segmented to the number of regions in accordance with these printer output characteristics. Because of this, the color conversion processing for the respective regions requires an increased amount of processing to consequently require a significant amount of memory.

In the meantime, smoothing processing can basically provide an effective measure against the above-described problem where a different color or gradation is reproduced dependent on the type of the document. Specifically, an image may be subjected to the smoothing processing to provide, in the subsequent color conversion processing, a certain color or gradation, which is shown in the image finally printed based on the reading result, regardless of the type of the document. The reason will be briefly described below.

FIG. 1 is a graph showing color differences, as the maximum color difference and an average color difference, between an image printed without subjecting an image read by a scanner to the smoothing processing and an image printed with subjecting the read image to the smoothing processing. In particular, FIG. 1 shows resultant color differences between respective sets of 729 color patches each set of which is made by combining respective nine levels of colors of R, G, and B and which are printed by respective three types of print methods of the offset printing, the silver halide photography, and the ink jet photograph printing (hereinafter IJ photograph printing). As can be seen from FIG. 1, those subjected to the smoothing processing and those not subjected to the smoothing processing have certain color differences therebetween respectively. In particular, the offset printing shows significant differences between those subjected to the smoothing processing and those not subjected to the smoothing processing, and also shows a higher average color difference than the maximum color differences of the silver halide photograph and the IJ photograph.

FIGS. 2A to 2D are diagrams illustrating how the smoothing processing reduce the influence by the color difference as described above on the reproduced color or the reproduced gradation characteristic.

FIG. 2A schematically illustrates a document image represented based on the area coverage modulation. FIG. 2B schematically illustrates the document image based on the density modulation. The image based on the area coverage modulation shown in FIG. 2A consists of three colors of colors 21A, 21B, and 21C and is macroscopically recognized as having the same colors of the image based on the density modulation shown in FIG. 2B. For example, a color conversion processing for print output such as an output device color conversion, which will be described later, is applied to each pixel and the color conversion is optimally controlled for each pixel. FIG. 2C and FIG. 2D show the result of subjecting the images shown in FIG. 2A and FIG. 2B to the color conversion processing for print output, respectively. The colors 23A, 23B, and 23C in FIG. 2C show the result of subjecting the pixels of the three colors of 21A, 21B, and 21C to the color conversion processing, respectively. When the three colors of 21A, 21B, and 21C are close to one another (when the dispersion of the colors is small), the image shown in FIG. 2C and the image shown in FIG. 2D, which have been subjected to the color conversion for print output, have macroscopically close colors to each other. However, when the three colors of 21A, 21B, and 21C are distant from one another (when the dispersion of the colors is large), the image shown in FIG. 2C and the image shown in FIG. 2D, which have been subjected to the color conversion, have macroscopically distant colors (different colors) from one another.

Consequently, the image shown in FIG. 2A is previously subjected to the smoothing processing to cause the colors 21A, 21B, and 21C to have a small dispersion so that the image shown in FIG. 2C and the image shown in FIG. 2D, which have been subjected to the color conversion for print output, have macroscopically close colors to each other. In this manner, the smoothing processing can reduce the problem caused by different types of manuscript copies that cause proportionally-different reproduced colors or reproduced gradation characteristics. The smoothing is effective for a document causing a large color difference such as the document printed by the offset printing because the effect of the averaging effect by the smoothing processing is proportionally high.

However, when the smoothing processing described above is simply applied, the gradation characteristic of the printed image may be degraded in the relation with the color conversion for print output that is executed after smoothing processing.

For example, in printing considering a copy function in particular, a gamut mapping, which is a color conversion for print output, may reproduce colors having the lightness equal to or higher than the lightness of the white point of a printer color gamut as white of the printer color gamut and colors having the lightness equal to or lower than the black point of the printer color gamut as black of the printer color gamut. These methods are also called as "whitening" and "blacking", respectively. These methods can realize favorable image reproduction even when copy is repeated for the document which has been obtained by the copy. However, if the smoothing processing is simply applied, pixels in a certain region may be entirely subjected to the blacking or whitening in the subsequent gamut mapping. In this case, this region is entirely represented by black or white, damaging the gradation characteristic of the entire image.

SUMMARY OF THE INVENTION

An object of the present invention is to provide an image processing apparatus and an image processing method in which image data can be subjected to smoothing processing to improve color reproducibility and an image that is free from a deteriorated gradation characteristic can be printed.

In a first aspect of the present invention, there is provided an image processing apparatus that executes image processing for each pixel, which includes smoothing processing of image data and color conversion processing of image data that has been subjected to the smoothing processing, said apparatus comprising: a gradation adjustment unit that adjusts gradation of the image data smoothed by the smoothing processing so that the number of pixels which are converted into a predetermined color by the color conversion processing is made smaller.

In a second aspect of the present invention, there is provided an image processing method of executing image processing for each pixel, which includes smoothing processing of image data and color conversion processing of image data that has been subjected to the smoothing processing, said method comprising the step of: adjusting gradation of the image data smoothed by the smoothing processing so that the number of pixels which are converted into a predetermined color by the color conversion processing is made smaller.

According to the above described configuration, the image data which has been subjected to smoothing is subjected to a gradation adjustment so that a color conversion after a smoothing can reduce the number of pixels converted to a predetermined color such as a color having a target lightness of blacking, in the color conversion. As a result, the smoothing can improve the color reproducibility and can print an image that is free from deteriorated gradation characteristic.

Further features of the present invention will become apparent from the following description of exemplary embodiments with reference to the attached drawings.

BRIEF DESCRIPTION OF THE DRAWINGS

FIGS. 2A to 2D are diagrams illustrating how the smoothing processing reduce the influence by the color difference as described above on the reproduced color or the reproduced gradation characteristic;

FIG. 3B shows a document stand cover that also functions as an auto document feeder is opened;

DESCRIPTION OF THE EMBODIMENT

Hereinafter, embodiments of the present invention will be described in detail with reference to the drawings.

MFP

Figure 3A:
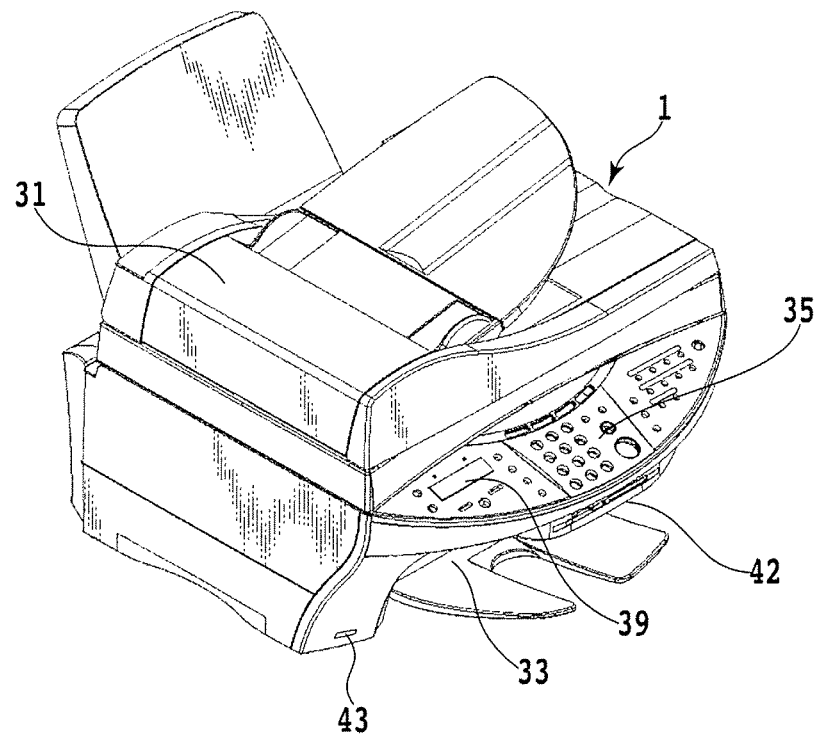
FIGS. 3A and 3B are an appearance perspective view and a perspective view of a multi-function printer (MFP) according to an embodiment of the present invention, respectively.
Figure 3B:
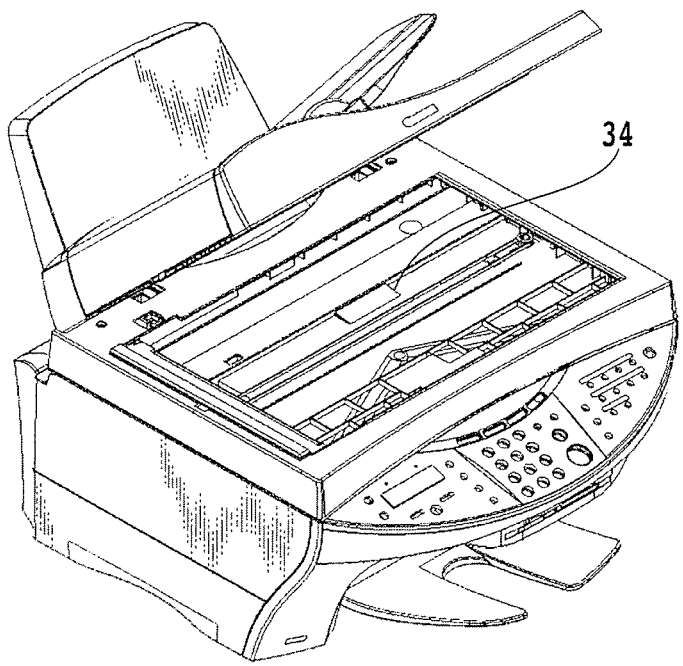

FIGS. 3A and 3B are an appearance perspective view and a perspective view of a multi-function printer (MFP), which shows a cover being opened that is a document cover and also functions as an auto document feeder, according to an embodiment of the present invention, respectively. The MFP apparatus 1 has a function as a general PC printer to receive data from a host computer (PC) to print the data and a scanner function. The MFP apparatus 1 also has a copy function in which the priner prints an image read by the scanner, a function to directly read image data stored in a storage medium such as a memory card to print the data, or a function to receive image data from a digital camera to print the data.

The MFP apparatus 1 includes a reading apparatus 34 by a scanner including a CCD sensor. The reading apparatus reads a document directly placed on a platen or a document supplied from the auto document feeder (hereinafter ADF) 31. A printing apparatus 33 is an ink jet type apparatus that uses four colors of cyan (C), magenta (M), yellow (Y), and black (K) to provide printing on a printing medium such as a paper.

The MFP apparatus 1 further includes an operation panel 35 that includes a display panel 39 and various key switches for example. The back face of the MFP apparatus 1 includes a USB port (not shown) for the communication with the PC. The MFP apparatus 1 further includes a card slot 42 for reading data from various memory cards and a camera port 43 for the data communication with a digital camera. It is noted that the printing method of the printing apparatus in the application of the present invention is not limited to the ink jet method. For example, the printing method also may be other methods such as an electronic photograph method.

Figure 4:
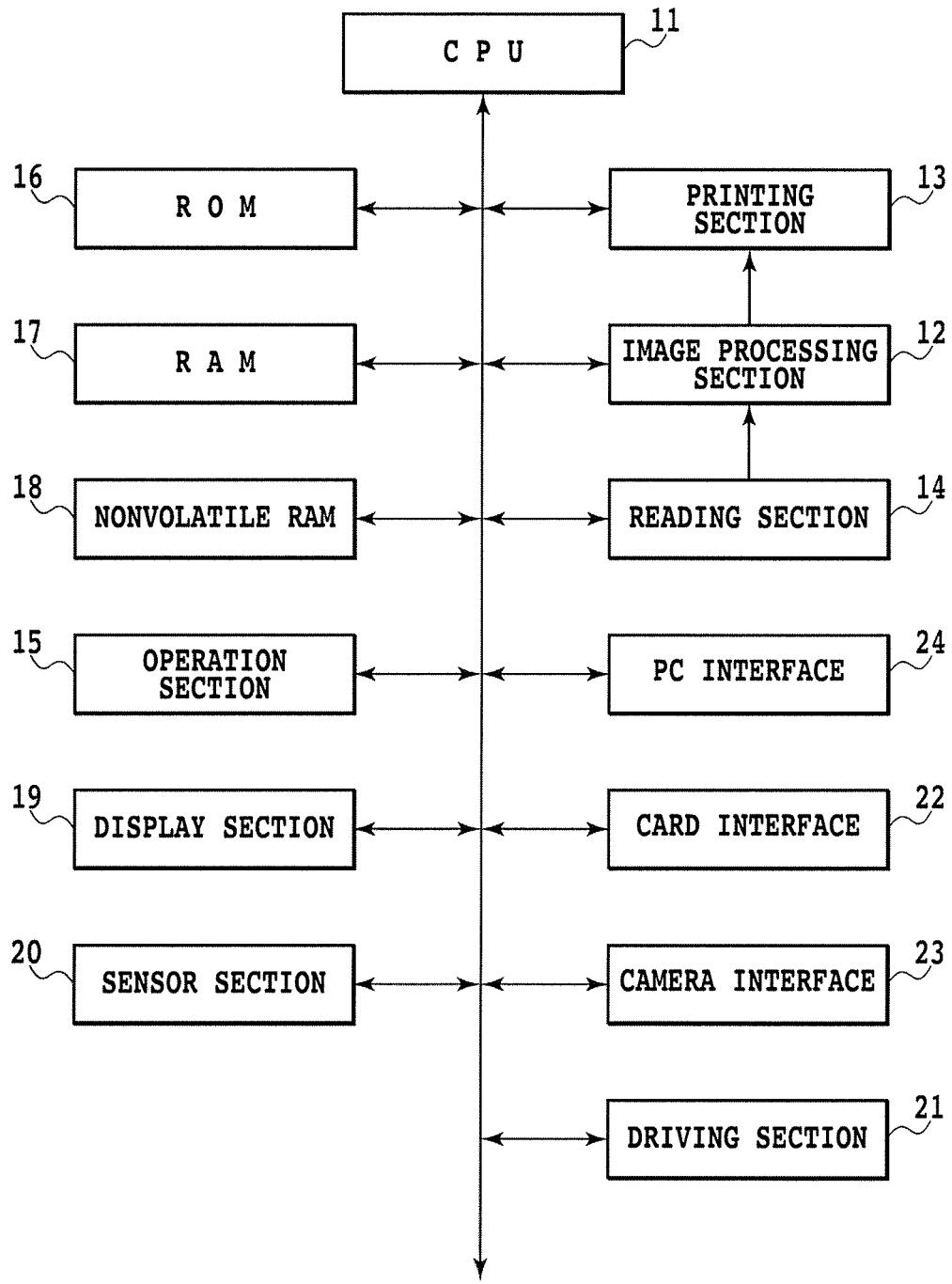
FIG. 4 is a block diagram illustrating a configuration of the control and the image processing for example of the MFP shown in FIGS. 3A and 3B.

FIG. 4 is a block diagram illustrating a configuration for executing a control and image processing of the MFP shown in FIGS. 3A and 3B.

In FIG. 4, a CPU 11 controls various functions of the MFP 1 and carries out, in accordance with a predetermined operation through an operation section 15 having an operation panel 35, an image processing program stored in a ROM 16. This program also includes a processing program of an embodiment of the present invention which will be described later with reference to FIG. 5, FIG. 10, FIG. 11, and FIG. 16 for example. The reading section 14 having the reading apparatus 34 reads a document image to convert the read analog brightness data to digital brightness data of red (R), green (G), and blue (B) to output the data to an image processing section 12. It is noted that the reading section 14 also may include a contact image sensor (CIS) instead of the CCD.

A card interface 22 having the card slot 42 reads, in accordance with the predetermined operation through the operation section 15, image data that is photographed by a digital still camera (hereinafter DSC) and is stored in a memory card for example. The color space of the image data read via the card interface 22 is converted by the image processing section 12, as required, from a DSC color spaces (e.g., YCbCr) to a standard R, G, and B color space (e.g., NTSC-RGB or sRGB). The read image data is also subjected, based on the header information thereof, various processing required for the application (e.g., resolution conversion for obtaining effective pixels). The camera interface having the camera port 43 is directly connected to the DSC to read image data.

The image processing section 12 executes an image processing which will be described later with reference to FIG. 5, such as an input device color conversion, an image correction/processing, an output device color conversion, a color separation, and a quantization. The resultant printing data obtained by the image processing is stored in the RAM 17. When the printing data stored in the RAM 17 reaches a predetermined amount required for the printing by the printing section 13 having the printing apparatus 33, the printing operation by the printing section 13 is carried out.

A nonvolatile RAM 18 is constituted by a SRAM backed up by a battery for example and stores data unique to the image processing apparatus for example. The operation section includes a photo direct print start key, an order sheet print key, and an order sheet reading key to select the image data stored in the printing medium to start the printing. The nonvolatile RAM 18 further includes a copy start key for monochrome copy or color copy, a mode key for specifying a mode for a copy resolution or an image quality, a stop key for stopping a copy operation for example, and a ten key and a registration key for inputting the number of copies. The CPU 11 detects the depression state of these keys to control the respective section depending on the state.

The display section 19 includes a display panel 39 (FIG. 3A). Specifically, this display section includes a dot matrix type liquid crystal display section (LCD) and a LCD driver to provide various displays based on the control by the CPU 11. The display section 19 also displays thumbnails of image data stored in a storage medium. The printing section 13 having the printing apparatus 33 is constituted by an ink jet type printing head, a general-purpose IC for example and the like and reads, based on the control by the CPU 11, the printing data stored in the RAM 17 to print a hard copy.

A driving section 21 is composed, for example, of a stepping motor and a DC motor for driving a paper feed roller in the above-described reading section 4 and printing section 3; a gear for transmitting the driving force of the stepping motor and the DC motor; and a driver circuit for controlling the stepping motor and the DC motor. The sensor section 20 is composed, for example, of a printing paper width sensor, a printing paper existence sensor, a document width sensor, a document existence sensor, and a printing medium sensor. The CPU 11 detects the states of the document or the printing paper based on the information obtained from these sensors.

The PC interface 24 is an interface between the PC and this MFP apparatus 1. The MFP apparatus receives an instruction for a printing operation and a reading operation through this PC interface 24.

In the configuration as described above, during a copy operation, the image data read by the reading apparatus 34 is subjected to a predetermined image processing by the image processing section 12 and printing is performed by the printing apparatus 33 based on the resulting data of the image processing.

Image Processing

Figure 5:
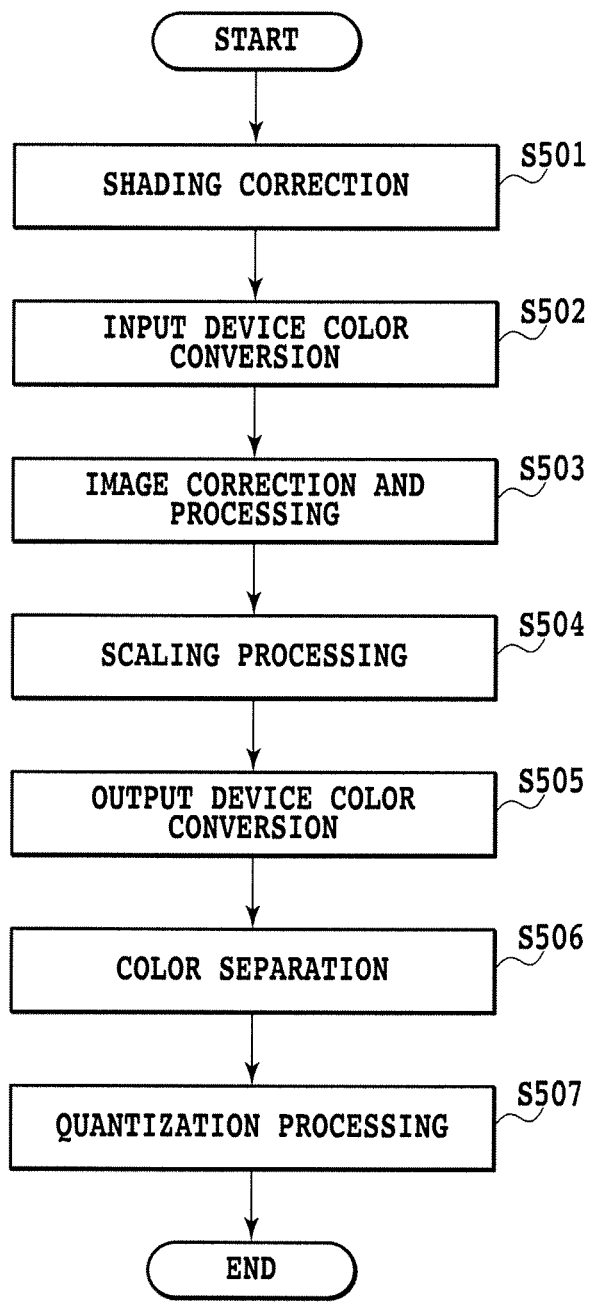
FIG. 5 is a flowchart showing the image processing carried out in the copying operation in the MFP.

FIG. 5 is a flowchart showing an image processing executed in a copy operation in the MFP of this embodiment.

In FIG. 5, at the beginning, Step 501 subjects the data read and AD-converted by the reading section 14 to a shading correction for correcting variations in the data caused due to variations of imaging devices. Next, Step 502 executes an input device color conversion. This conversion can convert the image signal data unique to the color space of the device to signal data of a standard color space not depending on the device. The standard color space may be based on the known ones such as sRGB specified by International Electrotechnical Commission (IEC) and AdobeRGB proposed by Adobe Systems. In this embodiment, the conversion is performed by using a lookup table. It is noted that a matrix calculation method also may be used as a conversion method.

The converted data is subjected in Step 503 to a correction processing/processing. The details of these processing include an edge reinforcement processing for correcting the so-called blur of an image due to the reading operation, a character processing for improving the readability of characters, a processing for removing the offset caused in the reading operation by light emission, and the like. In addition to these processing, a smoothing processing as a feature cancel processing and a gradation adjustment processing according to an embodiment of the present invention are also performed, which will be described in detail with reference to FIG. 11. Specifically, the smoothing processing and the gradation adjustment processing are also performed that take consideration the blacking and whitening in the gamut mapping in Step 505.

Step 504 executes an image scaling processing. In this step, the magnification is converted to an intended magnification when a different magnification is specified by a user or when allocation copy is specified to allocate two manuscript copies to a single paper. The conversion method may generally be a bi-cubic method or a nearest neighbor method.

Next, Step 505 converts image signal data of the standard color space to signal data unique to the printing apparatus as an output device. This conversion is, as described later, a conversion (color conversion of color gamut mapping) by using a gamut mapping.

Next, Step 506 executes a conversion processing for converting the signal data unique to the output device to ink color data of cyan (C), magenta (M), yellow (Y), and black (K) used in the MFP. This conversion also may use the same method as that of Step 502. Then, Step 507 converts the image signal data to have levels at which the data can be printed by the printing apparatus 33. Specifically, the printing apparatus 33 of this embodiment represents an image in a binary manner based on whether ink is ejected or not. Thus, a quantization method such as error diffusion is used to convert the data to binary data.

Next, the color conversion for the output device of Step 505 will be described further in detail. In this embodiment, a lookup table for the color conversion for the output device is defined as an output profile and will be hereinafter also referred to as an output color conversion table.

The output color conversion table shows a correspondence between color signals of the sRGB color space as a standard color space and color signals of a color gamut of the printing apparatus (hereinafter also simply referred to as a printer color gamut). Specifically, the table defines discrete grid points by using the signal data of the sRGB color space and makes correspondences between the respective grid points and color signals of the printer color gamut.

Figure 6:
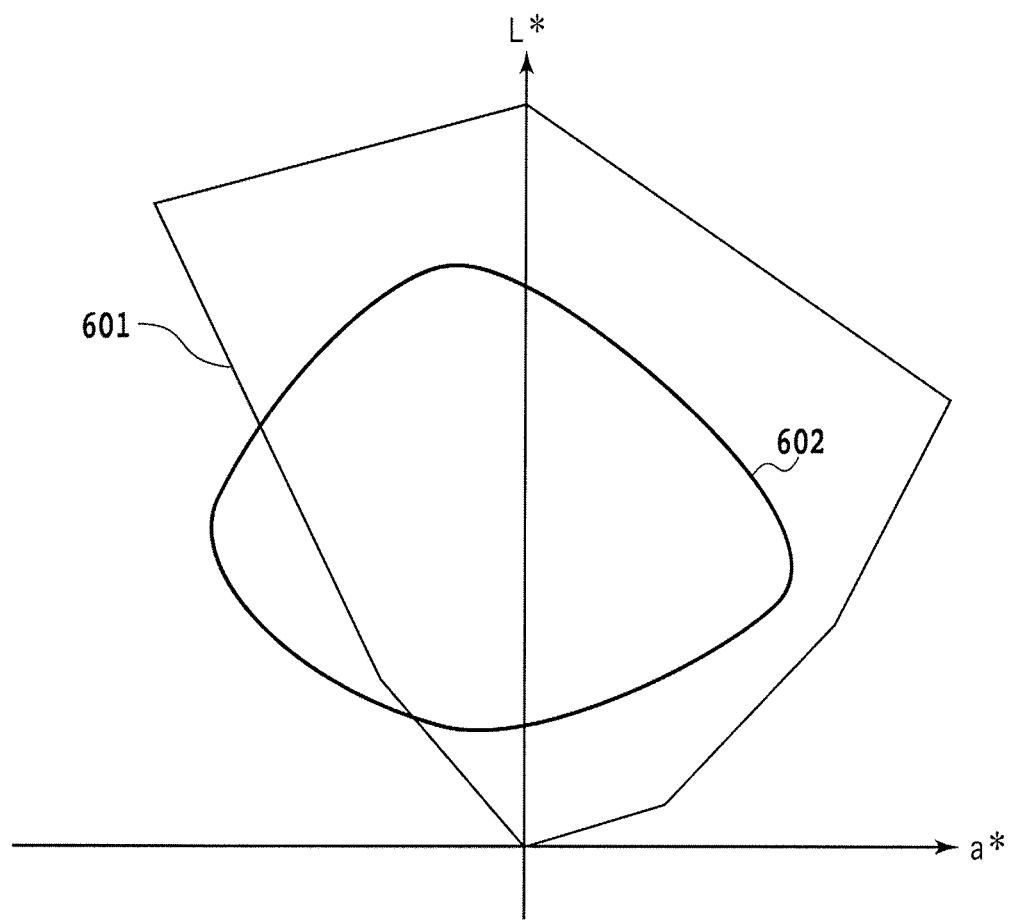
FIG. 6 is a diagram showing a color gamut of a standard color space and a printer color gamut by CIE-L*a*b color coordinate system.

FIG. 6 shows a sRGB color gamut 601 by signals of a sRGB color space as a standard color space and a printer color gamut 602, in a CIE-L*a*b* color coordinate system. Hereinafter, it is assumed that all color spaces shown in the drawings of embodiments of the present invention are represented based on the CIE-L*a*b* color coordinate system. It is noted that this color coordinate system to be handled is not limited to the CIE-L*a*b* color coordinate system and also may be a similar color system such as a L*u*v* color space.

As shown in FIG. 6, the sRGB color gamut 601 and the printer color gamut 602 have different shapes and sizes for example. For this reason, the color conversion table is prepared by using the "gamut compression" technique for compressing the color gamut of the standard color space to the printer color gamut. In the gamut compression used in this embodiment, no-compression region, in which colors of the standard color space are reproduced as colors calorimetrically identical with colors in the printer color gamut, is defined in the printer color gamut, and colors of the standard color space except for the colors reproduced in the no-compression region are compressed to colors in a printer color gamut out of the no-compression region. By using the gamut compression method as described above, colors within the no-compression region can be reproduced to calorimetrically correspond to the color of the color gamut of the standard color space and colors not within the no-compression region can be reproduced to retain the gradation. For example, this gamut compression method allows, even when different printing media used for copy are a photograph-exclusive paper and a mat paper and have difference color gamut shapes, the same colors to be reproduced on these media.

Figure 7:
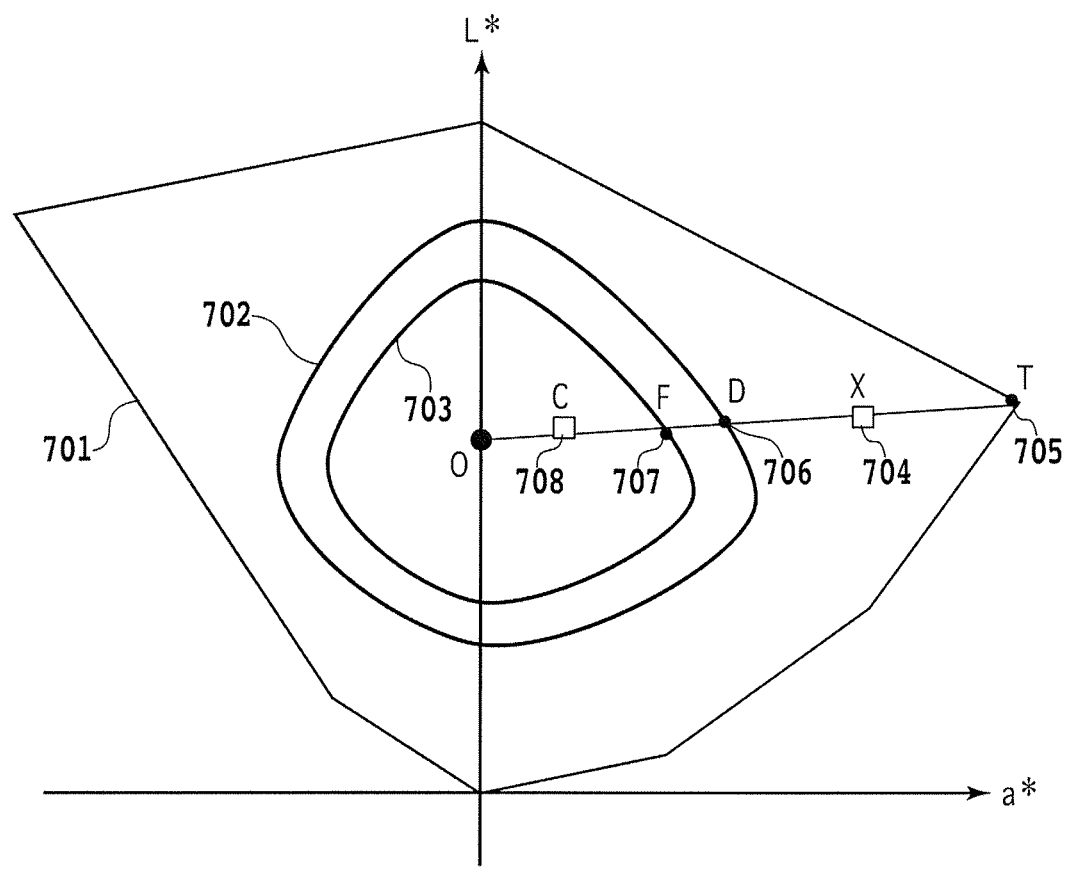
FIG. 7 is a diagram showing an example of the gamut compression used in one embodiment of the present invention.

FIG. 7 is a diagram illustrating an example of the gamut compression used in this embodiment. In FIG. 7, the color gamut 701 and the color gamut 702 are obtained by projecting the color gamut of the sRGB color space and the printer color gamut on the L*a plane. The color gamut 703 shows the no-compression region for reproducing the color that is calorimetrically identical with that of the sRGB color space. In this example, the no-compression region has a similar shape as that of the printer color gamut and is 80% of the size of the printer color gamut. The point "O" shows a compression convergence point. The points 704 and 708 show colors corresponding to grid points in the sRGB color space.

The gamut compression firstly determines whether the grid point of the sRGB color space is positioned within the no-compression region or not. This processing for determining whether the point exists within the color gamut or not is performed based on the method as described below. First, a length of a vector (called as a source vector) connecting the point to be determined to the compression convergence point is calculated. Next, a length of a vector having a sense from the compression convergence point to the point to be determined, which vector (called as a color gamut vector) connects the compression convergence point to an intersection point at which the vector intersects with the surface of the color gamut is calculated and the length of the source vector is compared with the length of the color gamut vector. When the length of the source vector is longer than the length of the color gamut vector, the point to be determined is determined as being out of the color gamut. When the length of the source vector is shorter than the length of the color gamut vector, the point to be determined is determined as being within the color gamut.

The above described processing for determining whether the point exists within the color gamut or not determines that the point 708 is within the no-compression region. In this case, the compression processing is not performed and the same value as that of the input sRGB value is retained. On the other hand, the point 704 is determined as the one for a color not within the no-compression region and thus is subjected to the gamut compression based on the following method. That is, the point 704 is subjected to the gamut compression to be move to a point in the printer color gamut which is not within the no-compression region. More specifically, the distance X between the point 704 and the compression convergence point O is calculated. Further, points 705, 706 and 707 at the intersections of a straight line passing through the point O and the point 704 with respective the outline of the color gamut 701 in the sRGB color space, the outermost line of the printer color gamut 702, and the outline of the no-compression region 703 are found respectively, and the respective distances between the respective intersection points and the point O are calculated. In FIG. 7, the respective distances are represented by T, D, and F. Based on the relation between the distances from the compression convergence point O, the point 704 is compressed to be in the printer color gamut. The point 704 is linearly compressed to a point on the straight line passing through the point O and the point 704 so to correspond to the point at a distance that can be calculated by the following compression function (1).

$$X' = \frac{(D-F)(X-F)}{T-F} + F \qquad (1)$$

It is noted that the compression function does not have to be linear as shown in the formula (1) and also may be a multi-dimensional function or a similar function according to which a position farther away from the color gamut is subjected to losing of gradation. Further, although the size of the no-compression region is about 80% of the size of the printer color gamut, the size of the no-compression region is not limited to this. When the size of the no-compression region is 100% the same as the printer color gamut, the color in the printer color gamut can be subjected to the gamut compression method according to which the color can be calorimetrically identical and colors not within the color gamut are lost.

Next, the so-called whitening and blacking processing will be described that are carried out as a part of the above-described gamut compression in the gamut mapping of this embodiment.

There may be a case where a copy function is used to copy a document and the copied printing matter as a document is again copied. In order to allow such a repeated copying to realize a favorable image reproduction, a color having a lightness equal to or higher than a specific lightness (e.g., the lightness of a white point of the printer color gamut) is mapped on the white point in the printer color gamut (white of a printing paper) (this mapping is referred to as "whitening"). Similarly, a color having a lightness equal to or lower than a specific lightness (e.g., the lightness of a black point of the printer color gamut) is mapped on the black point in the printer color gamut (this mapping is referred to as "blacking").

Figure 8:
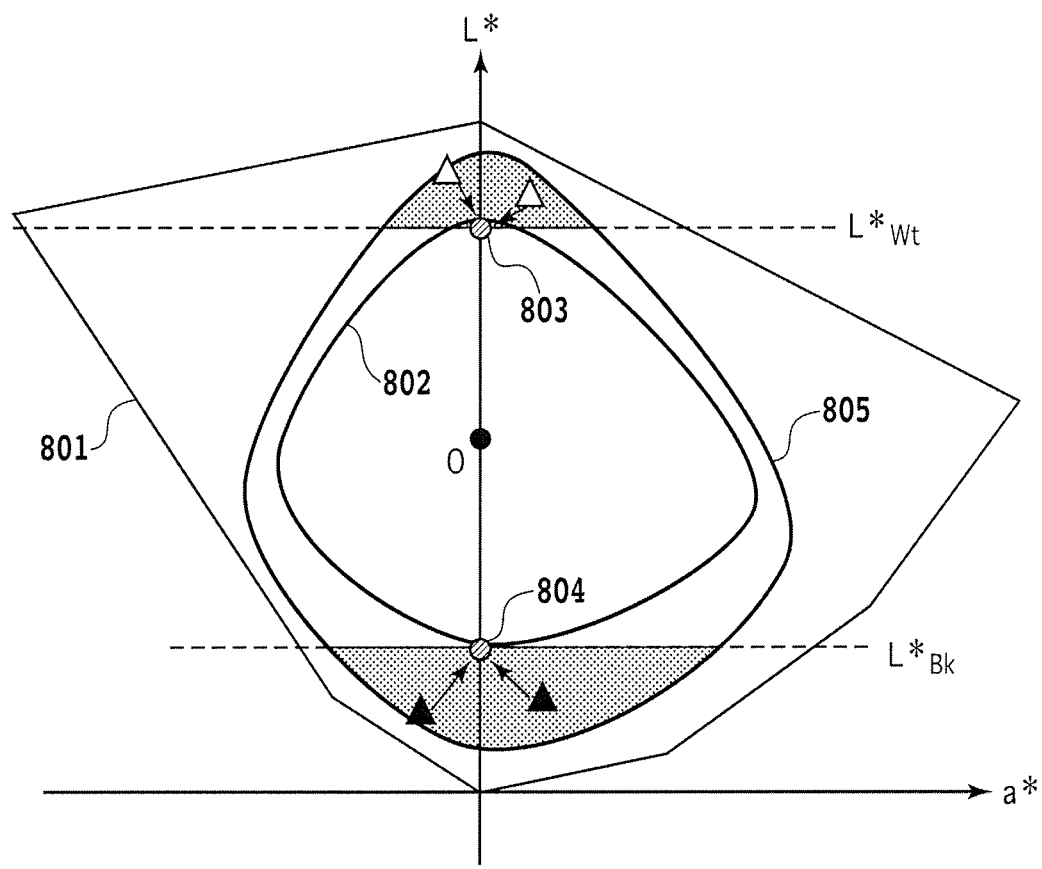
FIG. 8 is a diagram illustrating the details of whitening and blacking.

FIG. 8 is a diagram illustrating the details of the whitening and blacking. As described with reference to FIG. 7, a color gamut 801 and a color gamut 802 are obtained by projecting the color gamut of the sRGB color space and the printer color gamut on the L*a* plane, respectively.

The color gamut 802 is a printer color gamut when printing is performed onto a printing medium used for a copy operation. A point 803 shows a white point of the printer color gamut 802. L*Wt shows the lightness of the white point of the printer color gamut. Among points in the color gamut 801 of the sRGB color space, the grid points (colors) having the lightness equal to or higher than L*Wt is all subjected to the gamut compression to be shifted to the point 803. In this manner, the whitening is performed. On the other hand, the point 804 shows a black point of the printer color gamut and L*Bk shows the lightness of the black point of the printer color gamut. In the blacking processing, among points in the color gamut 801 of the sRGB color space, the grid point (color) having the lightness equal to or lower than L*Bk is all subjected to the gamut compression to be shifted to the point 804.

As shown in FIG. 8, when an input document has the color gamut 805 for example, the colors shown by outlined triangles in the color gamut 805 have the lightness higher than the L*Wt and thus is entirely reproduced by white of a printing medium used. The colors shown by black triangles have the lightness lower than the L*Bk and thus is reproduced by black of the printer color gamut. Hereinafter, L*Bk will be referred to as a "blacking lightness" while L*Wt will be referred to as a "whitening lightness". Although L*Bk is the lightness of the black point of the printer color gamut in this example, the present invention is not limited to this aspect. For example, an error caused when reading a document may cause the black point to be wrongly recognized as having a lighter color. These may be also taken into consideration and L*Bk may be set as a lightness that is higher than that of the black point of the printer color gamut.

Next, the color separation table used in the color separation processing of Step 506 will be described. When the image signals obtained by the output device color conversion (gamut mapping) of the above-described Step 505 is RGB signals, the RGB signals within the color gamut and colors specified in the calorimetric space (e.g., a CIE-L*a*b* value) have one-to-one correspondences. Thus, the color space by the RGB signal is used to specify for example 729 equally-spaced grid points. Then, color patch data corresponding to these 729 grid points is prepared and patches based on the color patch data are printed by a printing apparatus. The printed color patches are subjected to colorimetry to specify the color of the grid point represented by an RGB value unique to the printer as a color based on the CIE-L*a*b* color coordinate system for example. Next, the grid points of the sRGB color space obtained by the compression processing of Step 505 are converted to colors in the CIE-L*a*b color coordinate system, and respective grid points having the minimum color differences from the converted colors are found from the above 729 colorimetry values. Then, grid points around the point having the minimum color difference are used for an interpolating calculation to obtain printer RGB values corresponding to grid points of the sRGB color space, respectively. In the above described manner, the color separation table can be prepared that describes which ink colors of the printing apparatus are used for outputting the colors of the input color space.

Smoothing Processing

Figure 9A:
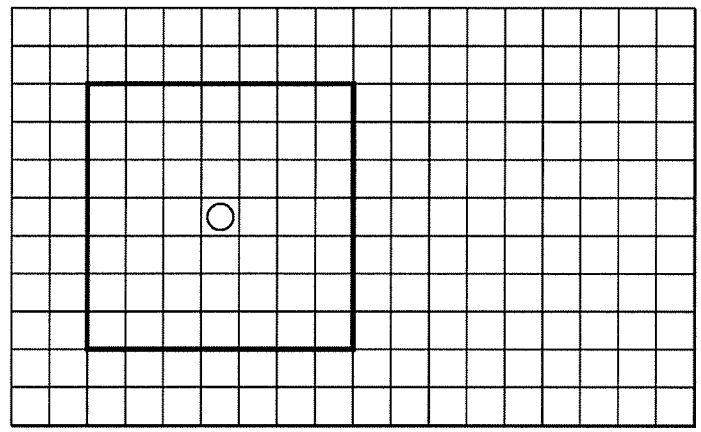
FIGS. 9A to 9C are diagrams illustrating a processing unit of the smoothing processing according to one embodiment of the present invention.
Figure 9B:
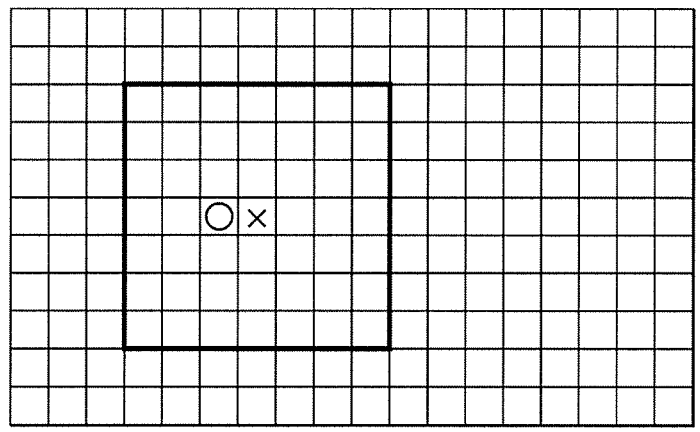
Figure 9C:
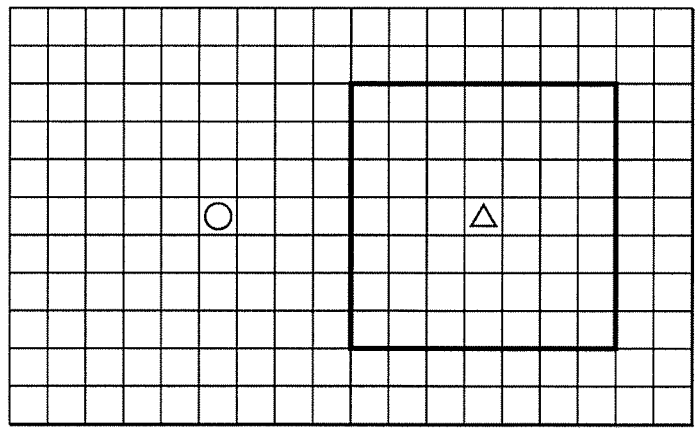

FIGS. 9A to 9C are diagrams illustrating a smoothing processing executed in Step 503 among the image processing shown in FIG. 5 and specifically show a processing unit of the smoothing processing.

FIG. 9A shows a case where the processing unit corresponds to a pixel unit. In the smoothing processing, a pixel denoted by a "○" mark in FIG. 9A is set as an object pixel. Next, a region that includes the object pixel at the center, that is surrounded by the thick line, and that consists of 7×7 pixels (7×7 region) is set. Then, the image signal within the set 7×7 region is used to set a smoothing strength to the object pixel for correcting the object pixel. For example, the correction is performed by replacing the pixel value of the object pixel by an average value of image signal values of all pixels in the 7×7 region. In this case, the smoothing strength is "1" showing that whole pixel value is replaced. It is noted that specific embodiments of the smoothing processing or the smoothing strength will be described in the respective embodiments which will be described later.

After the processing as described above, a pixel neighboring to the object pixel such as a pixel denoted by an "x" mark in FIG. 9B for example is set as the next object pixel. Then, in the same manner as that described above, the pixel denoted by the "x" mark is assumed as the object pixel to set the 7×7 region and to execute the smoothing processing. Thereafter, the object pixel is similarly moved by one pixel to set the 7×7 region each time for subjecting all object pixels for the smoothing processing to the smoothing processing.

When the processing unit corresponds to a region unit, the 7×7 region is set with regards to the pixel denoted by the "○" mark in FIG. 9A and the smoothing strength set to the pixel denoted by the "○" mark is applied to a plurality of pixels e.g., all pixels in the 7×7 region. Then, the 7×7 region is set with regards to the pixel denoted by a "Δ" mark shown in FIG. 9C to move processing unit so that the 7×7 region for the pixel denoted by the "○" mark and the 7×7 region for the pixel denoted by the "Δ" mark are adjacent to each other. It is noted that the processing unit used as the pixel unit can set the smoothing strength with a higher accuracy.

Figure 10:
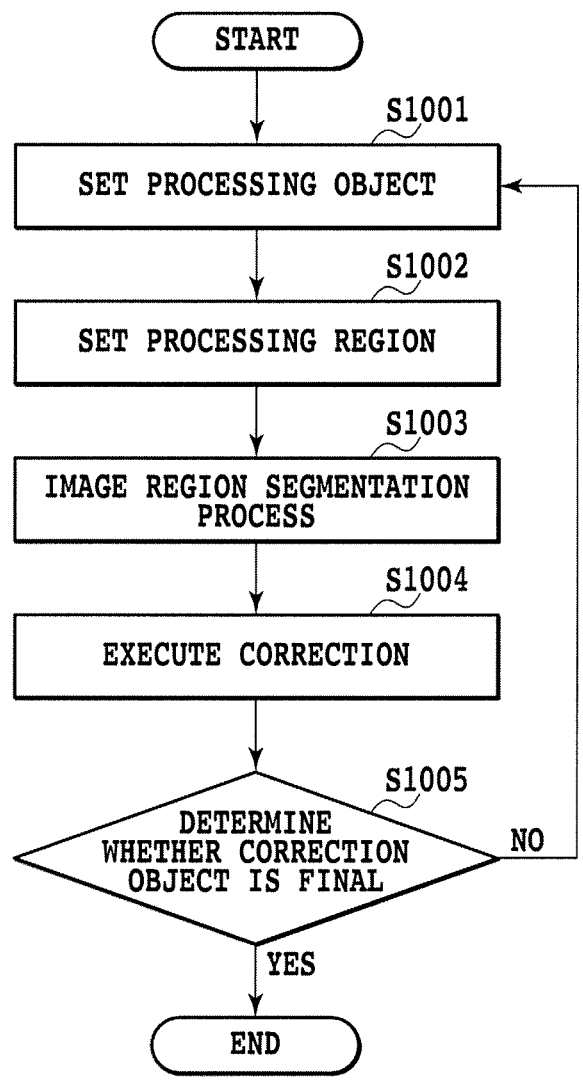
FIG. 10 is a flowchart illustrating the smoothing processing of this embodiment.

FIG. 10 is a flowchart illustrating the smoothing processing of this embodiment. Step 1001 sets a target to be subjected to the processing. The first processing object is set immediately after the start of this processing. When Step 1001 is returned from Step 1005, the next processing object is set. Step 1002 sets a processing region. The processing region is a region composed of a plurality of pixels including the processing unit as described above (the 7×7 region in the above example).

Step 1003 performs the image region segmentation. A region with respect to the processing unit is determined to specify region information. More specifically, this determination determines whether the region is an edge region for a character or the like or a flat region for an image or the like. Next, Step 1004 executes the processing and the correction processing based on the above determination for the region. Specifically, as described later with reference to FIG. 11, the region for a character for example is subjected to the edge reinforcement processing and a flat region for an image for example is subjected to smoothing processing and gradation adjustment processing. Then, Step 1005 determines whether corrections for all processing objects are completed or not. When the corrections for the all processing objects are not completed, the processing from Step 1001 is repeated.

Some embodiments of smoothing processing and gradation adjustment processing that reduces the influence of the smoothing processing which blacking and whitening come under, in the above-described image processing configuration, will be described below.

Embodiment 1

Figure 11:
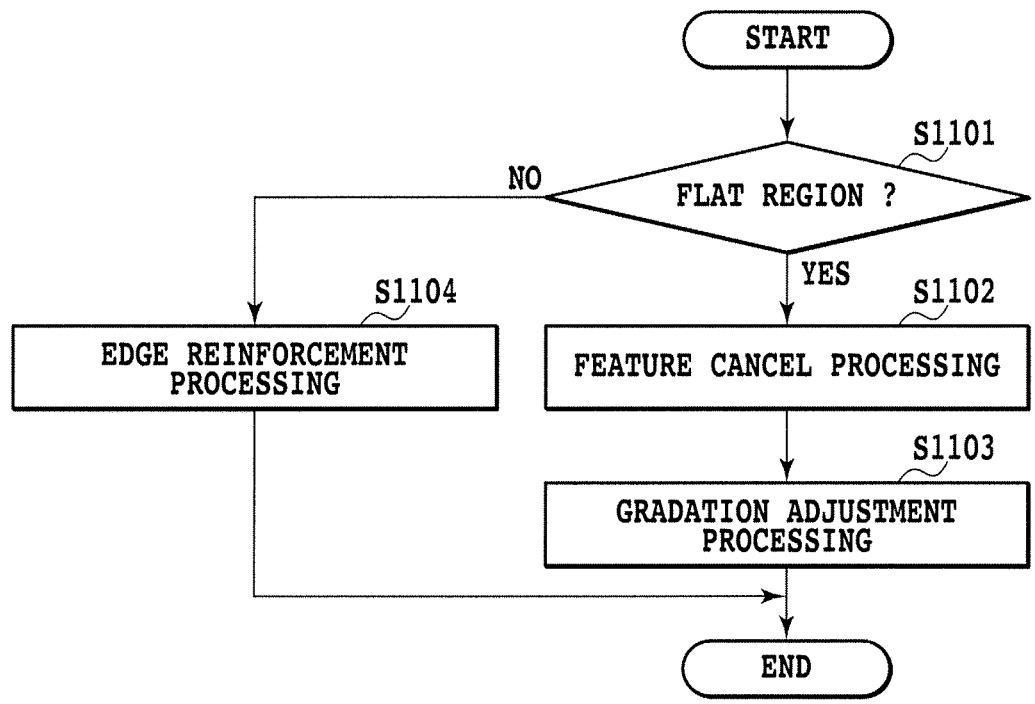
FIG. 11 is a flowchart illustrating image processing and correction processing according to the first embodiment of the present invention.

FIG. 11 is a flowchart illustrating processing and correction processing according to the first embodiment of the present invention and shows the details of Step 1004 shown in FIG. 10 in particular.

In FIG. 11, Step 1101 firstly branch the correction processing in accordance with the region information determined in Step 1003 of FIG. 10. Specifically, when the region information corresponds to a flat region for an image for example (YES), the correction processing (Step 1102, Step 1103) according to one embodiment of the present invention is executed. When the region information does not correspond to a flat region but corresponds to a character for example (NO), the edge reinforcement processing (Step 1104) is executed.

Figure 1:
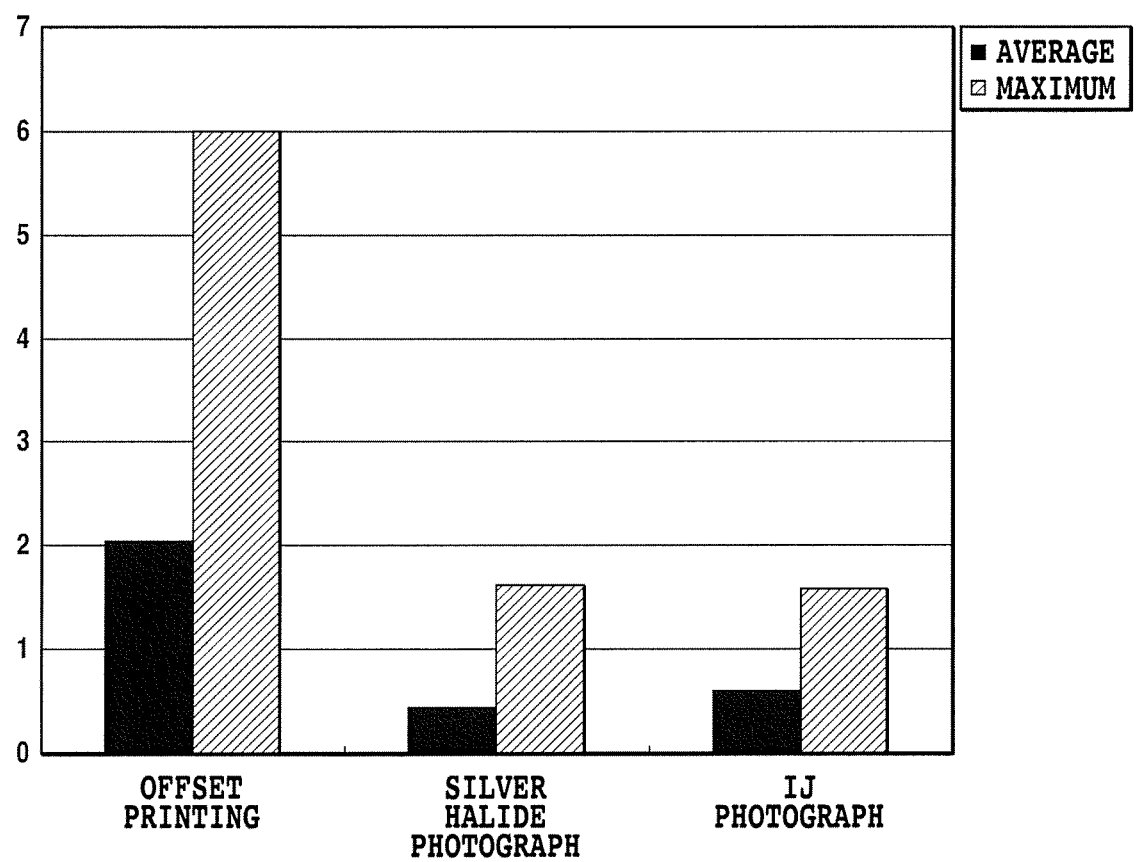
FIG. 1 is a graph showing color differences, as the maximum color difference and an average color difference, between an image printed without subjecting an image to smoothing processing and an image printed with subjecting to the smoothing processing.

Step 1102 performs the smoothing as feature cancel processing. The smoothing provides, as described above with reference to FIGS. 1 and 2, certain color reproduction and gradation reproduction regardless of a difference in the type of a document image. For example, an ink jet printer is desirably subjected to the smoothing to reduce the dispersion of colors within a predetermined range. Generally, the ink jet printer forms an image based on the area coverage modulation and thus represents the gradation in a region having a fixed size. The processing such as the gamut mapping, color separation, output γ correction after the processing and correction processing are performed on a pixel unit basis. Thus, colors of pixels existing in the predetermined range can have reduced dispersion to obtain a desired result.

More specifically, if colors among pixels in the region having a fixed size have a small dispersion, the image of those pixels are macroscopically close to one another even after the color conversion for print output. However, colors having a large dispersion are macroscopically away (different) from one another after the color conversion. Thus, Step 1102 subjects the image to the smoothing to reduce the dispersion of colors among pixels in the region having the fixed size. As a result, even when different types of document images are read by a scanner, the printing based on them can be carried out with fixed color reproduction and gradation characteristic.

In the smoothing of this embodiment, the pixel value of the object pixel is replaced by an average value of 5 pixels×5 pixels surrounding the object pixel. It is noted that, although the smoothing range was specified as 5 pixels×5 pixels, a region of an optimal size can be set depending on the resolution of an inputted image or the resolution of an output device.

Next, Step 1103 performs the gradation adjustment processing. The above described smoothing can make the dispersion of colors small. However, the smoothing may cause a pixel to have a lightness that is the object of the above-described blacking or whitening. In this case, a pixel which has lightness higher than the blacking lightness and essentially should not be mapped to the black point may be mapped to the black point by the gamut mapping. This causes the losing gradation such as blacking in the printed image. Thus, the gradation adjustment processing is performed to prevent the losing of gradation caused by the blacking or whitening after the smoothing processing.

The gradation adjustment according to this embodiment adjusts the lightness of a color having the lightness equal to or lower than the blacking lightness to become higher than the blacking lightness. Also for the whitening, the gradation adjustment according to this embodiment also adjusts the lightness of a color having the lightness equal to or higher than the whitening lightness to become lower than the whitening lightness.

Figure 12:
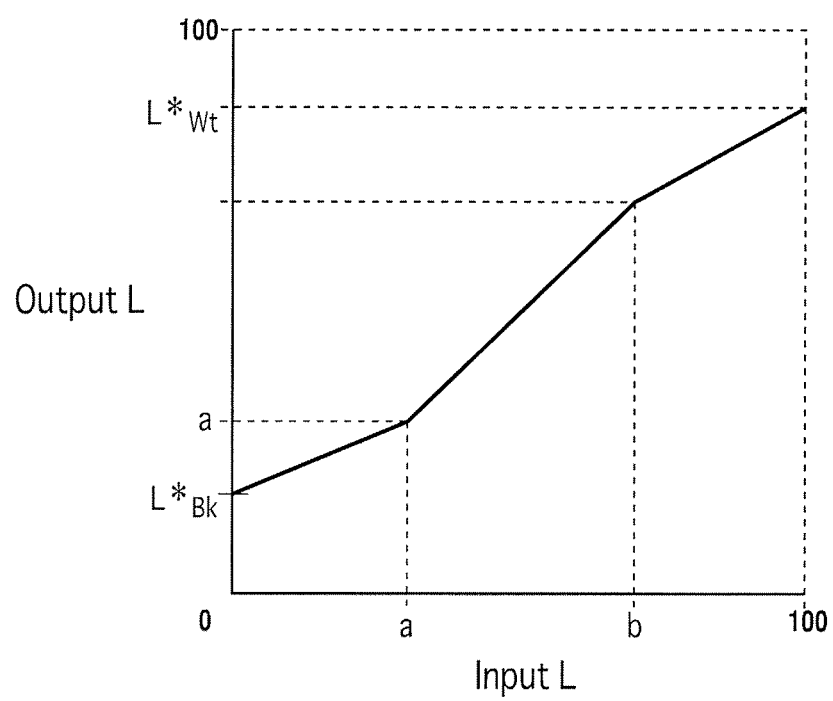
FIG. 12 is a diagram illustrating a lightness conversion according to the first embodiment.

FIG. 12 is a diagram illustrating a lightness conversion according to this embodiment. In FIG. 12, Input L represents the lightness L* of an object pixel and this lightness value is outputted as Output L according to one-dimensional lookup table (LUT) having the relation shown in the drawing. A range 1 to 100 of Input L corresponds to a range of the minimum lightness to the maximum lightness of sRGB color gamut 801 shown in FIG. 13. For the blacking, Input L of 0 corresponds to Output L of the blacking lightness L*Bk and Input L of "a" corresponds to Output L of "a". For the whitening, Input L of 100 corresponds to Output L of the whitening lightness L*Wt and Input L of "b" corresponds to Output L of "b". When Input L is in a range from "a" to "b", the same lightness as the input is outputted.

Figure 13:
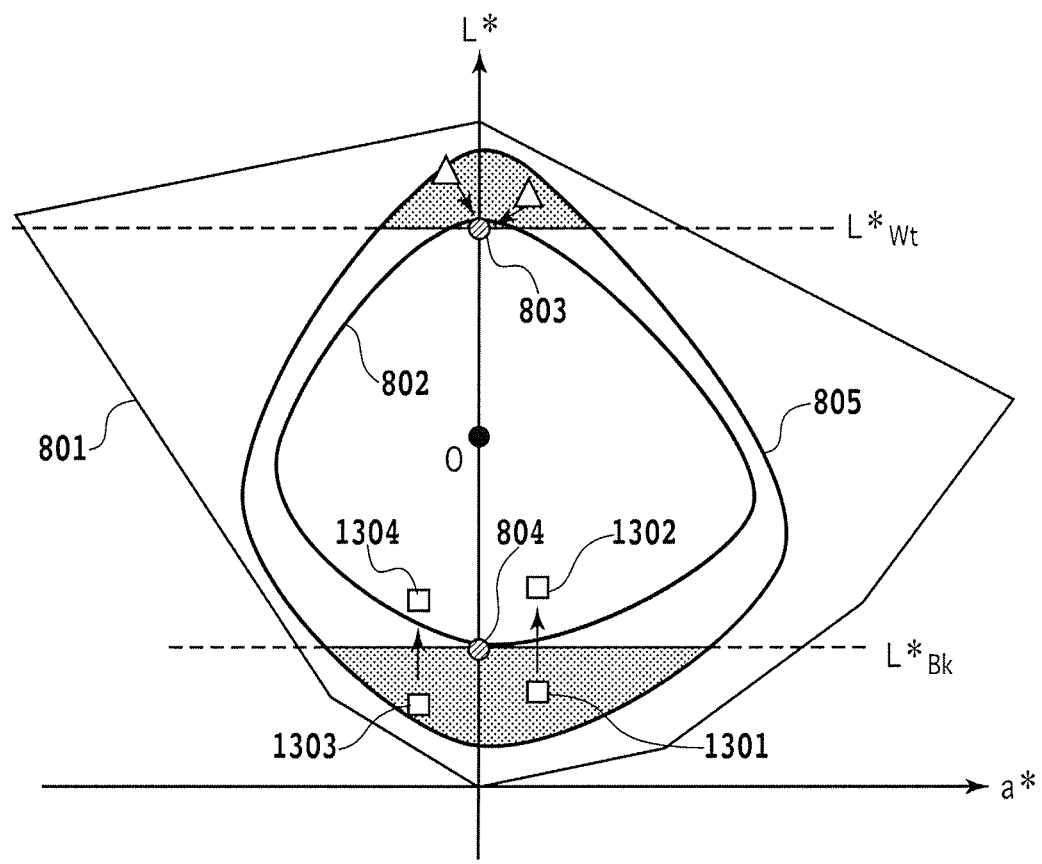
FIG. 13 is a diagram schematically illustrating the above lightness conversion.

FIG. 13 is a diagram schematically illustrating the lightness conversion as described above. As shown in FIG. 13, colors (points) 1301 and 1303 having the lightness equal to or lower than the blacking lightness L*Bk are converted to colors (points) 1302 and 1304 higher than the blacking lightness L*Bk, respectively. As a result, even when the image data which has been subjected to the correction and the process of this step is subjected to the compression by a gamut mapping in the output device color conversion processing (Step 505 of FIG. 5), the colors in the sRGB color gamut can be prevented from being mapped to the black point 804. The same applies to the whitening. Specifically, the color having the lightness equal to or higher than the whitening lightness L*wt can be converted to the color having the lightness lower than the whitening lightness L*wt to prevent the color in the sRGB color gamut from being mapped to the white point 803. This can prevent the losing pf gradation in a printed image due to the smoothing and provide a printing having fixed color reproduction and gradation reproduction.

With reference to FIG. 11 again, when Step 1101 determines that the region information corresponds to a region other than a flat section (e.g., a region such as including a character, a line, or an edge in a natural image), Step 1104 performs out the edge reinforcement processing and then complete this processing shown in FIG. 11. This edge reinforcement processing includes the correction of blur caused in a reading operation and a character processing for improving the readability of characters for example.

Figure 14:
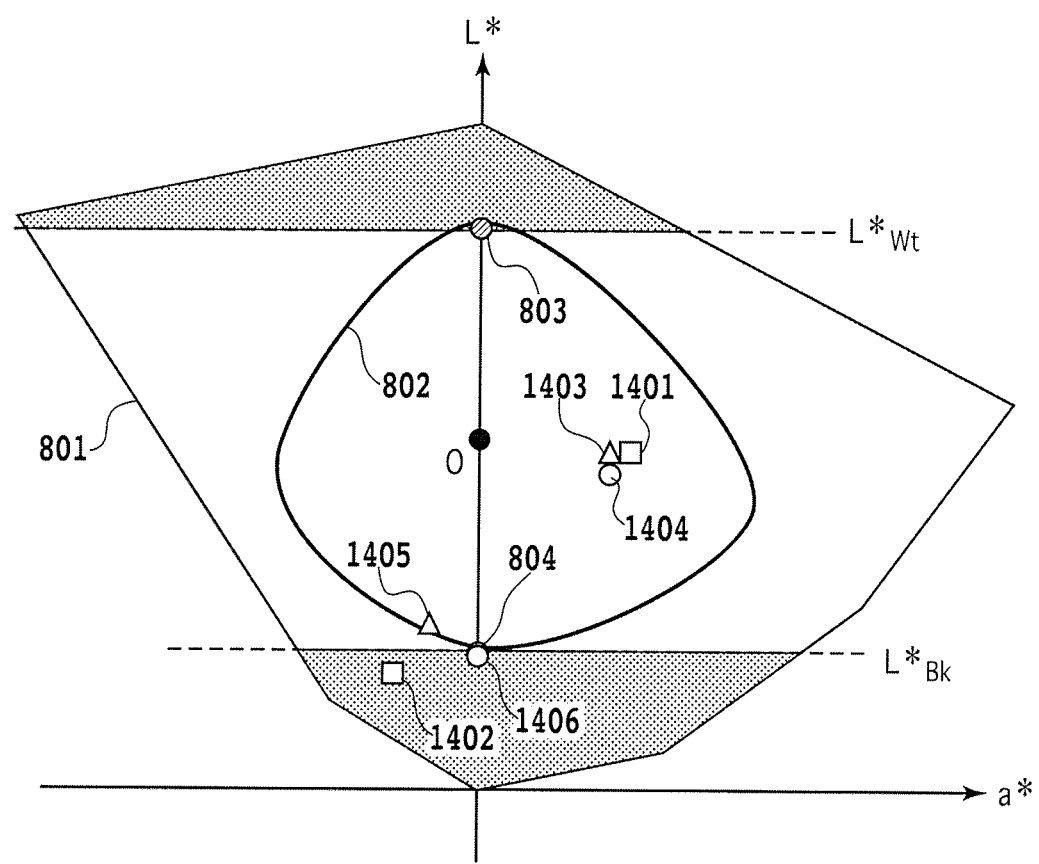
FIG. 14 is a diagram showing how inputted colors are outputted in the color gamut in the gamut mapping when the smoothing processing and the gradation adjustment processing of the first embodiment are not performed.

FIG. 14 is a diagram showing how inputted colors are outputted in the color gamut by the gamut mapping in the case that the smoothing processing and the gradation adjustment processing of the above-described embodiment are not performed. In FIG. 14, the color gamut 801 and the color gamut 802 are obtained by projecting the color gamut of the RGB color space and the printer color gamut to the L*a* plane, respectively. The point 803 represents the white point of the printer color gamut. L*Wt denotes the lightness of the white point of the printer color gamut, i.e. the whitening lightness.

In FIG. 14, a point □ 1401 denotes a color of a region not compressed by the blacking and the whitening. On the other hand, a point □ 402 denotes a color of a region compressed by the blacking.

When the macroscopic color of a point □ 1401 is a color of image data represented by the density modulation such as a photograph, the color of a point Δ 1403 expected as the printing output can be obtained by the gamut mapping. On the other hand, when the macroscopic color of the point □ 1401 is a color of data represented by the area coverage modulation such as halftone dots and the dispersion of the colors of the respective pixels is high (distances between colors are large), the color of the point □ 1401 is mapped to the color of a point ○ 1404, which is different from the color of the point Δ 1403 expected as the printer output. This is because the smoothing processing is not performed.

Furthermore, when the macroscopic color of the point □ 1402 is also a color of data represented by the density modulation, the color of the point □ 1402 is mapped to the point Δ 1405. On the other hand, when the point □ 1402 is a color of data represented by the area coverage modulation, the color of the point □ 1402 is mapped to the point ○ 1406 as the black point 804, which is a color different from that of the point Δ 1405. Although the point □ 1402 has a color having the lightness equal to or lower than the blacking lightness L*Bk, since this example shown in FIG. 14 does not perform the smoothing, the point □ 1402 is represented as a color originally having the lightness equal to or lower than the blacking lightness L*Bk.

Figure 15:
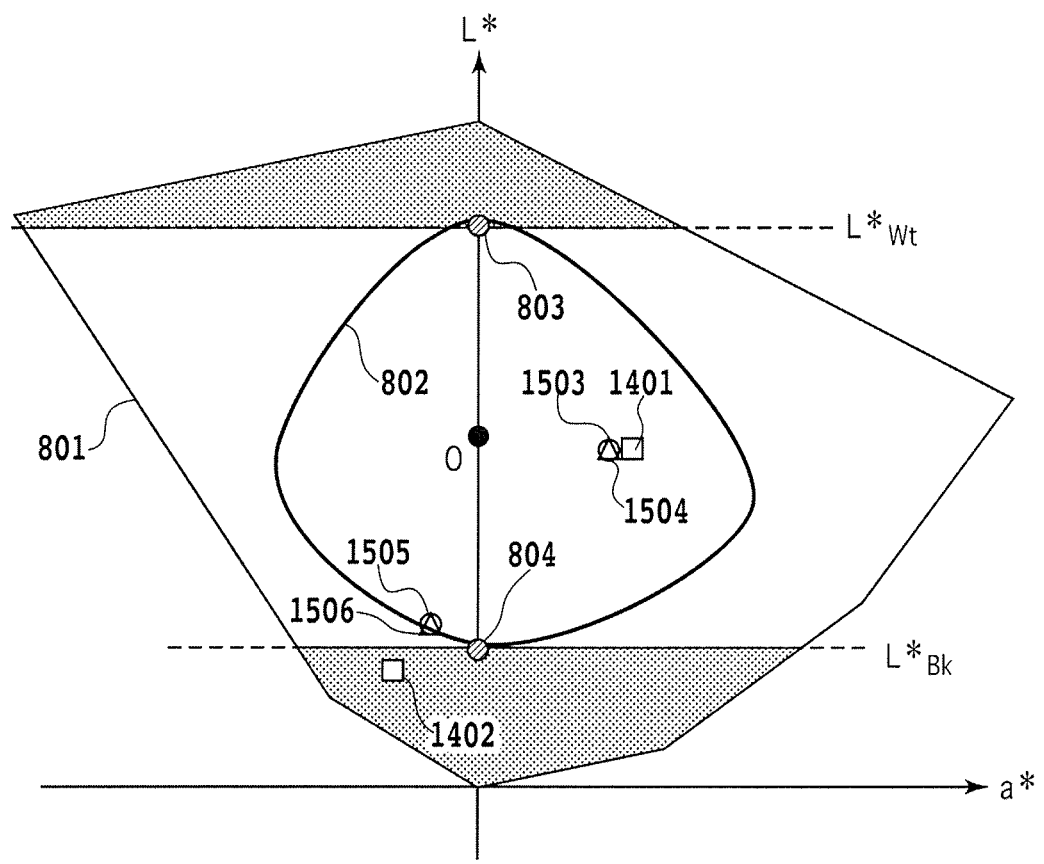
FIG. 15 is a diagram showing how an inputted color is outputted when the smoothing processing and the gradation adjustment processing of the first embodiment are performed.

FIG. 15 is a diagram showing how an inputted color is outputted in the case that the smoothing processing and the gradation adjustment processing according to this embodiment are performed. The points □ 1401 and 1402 represent the same colors as those represented by the same reference signs in FIG. 14. The data of these points is subjected to the processing of Steps 1102 and 1103 shown in FIG. 11 and are subsequently subjected to the gamut mapping.

As a result, even when the macroscopic color of the point 1401 is a color of data represented by the density modulation or a color of data represented by the area coverage modulation, the color is outputted as the one expected in the printing output. Specifically, the point Δ 1503 represents a color to which the point □ 1401 is mapped when the color of the point 1401 is a color of data by the density modulation and the point ○ 1504 represents a color to which the point □ 1401 is mapped when the color of the point 1401 is a color of data by the area coverage modulation. The colors by these modulations are converted to have almost the same color. This is because the smoothing processing reduces the dispersion of the colors of the respective pixels which express colors by the area coverage modulation.

On the other hand, even when the macroscopic color of point □ 1402 is a color represented by data of the density modulation or a color represented by the area coverage modulation, the colors by these modulations are not reproduced as the black point 804 and is outputted as a printer output to have the same color, regardless of these colors being the colors of the blacking region. The point Δ 1505 represents a color to which the point □ 1402 is mapped when the color of the point □ 1402 is a color of data by the density modulation and the point ○ 1506 is a color to which the point □ 1402 is mapped when the color of the point 1402 is a color of data by the area coverage modulation.

Here, the point □ 1402 shows a color that is a color originally not having the lightness equal to or lower than the blacking lightness L*Bk but that may become a color having the lightness equal to or lower than the blacking lightness L*Bk by the smoothing processing. However, such a color is subjected, as described above, to the gradation adjustment processing according to this embodiment and is converted to a color having the lightness higher than the blacking lightness LBk*. As a result, in the subsequent performed gamut, such a color is not mapped to the black point 804 but is mapped to the point ○ 1506. Specifically, the above described conversion can reduce the number of pixels mapped by the blacking processing to black points having the blacking lightness. As a result, the gamut mapping does not map such a color to the black point 804 and maps such a color to the point ○ 1506.

Embodiment 2

A second embodiment of the present invention relates to another embodiment of the gradation adjustment processing. The gradation adjustment processing according to this embodiment does not make colors having a certain range of the lightness subjected to the conversion, as in the first embodiment. Instead, the gradation adjustment processing according to this embodiment adds noise to values of a certain range of pixels to increase the dispersion of colors among the pixels.

Figure 16:
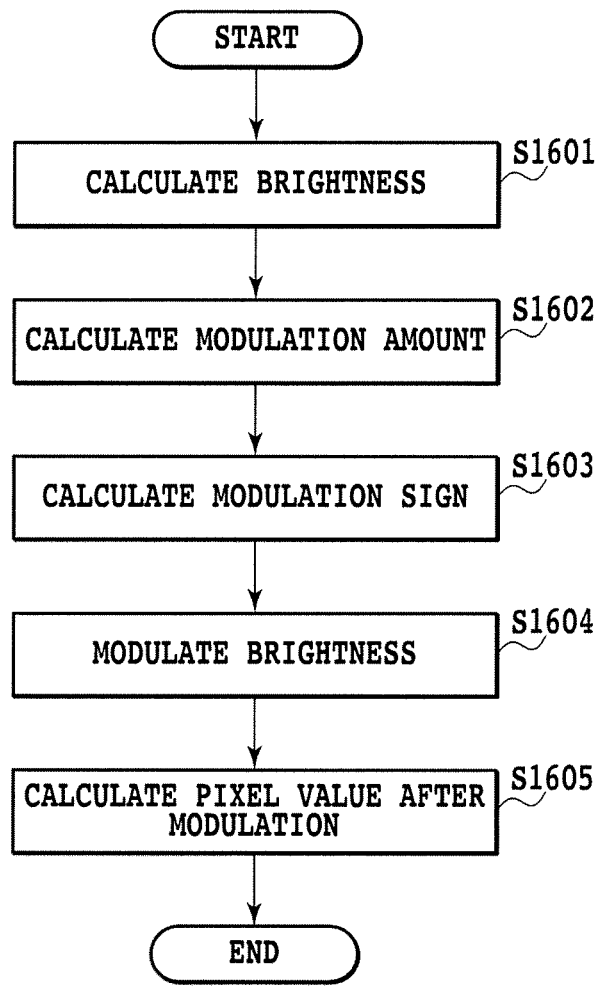
FIG. 16 is a flowchart illustrating the gradation adjustment processing according to the second embodiment of the present invention.

FIG. 16 is a flowchart showing the gradation adjustment processing according to the second embodiment of the present invention. It is noted that the processing described below clips, if not otherwise specified, a calculation result less than 0 to 0 and clips a calculation result equal to or higher than 256 to 256, respectively.

First, Step 1601 calculates the brightness of each pixel based on the RGB value that is the data of the pixel. A brightness value Y1 is calculated by the following calculating formula.

$$Y1 = 0.299 \times R + 0.587 \times G + 0.114 \times B \tag{2}$$

It is noted that, although this embodiment uses the brightness Y calculated by the formula (2), another value also may be used so long as the value represents the brightness component of an input pixel. For example, the value of L in an L*a*b* color space or a Luv color space also may be used. Alternatively, instead of using the brightness and lightness defined by these color spaces, the brightness and lightness also may be approximately represented for a simpler calculation.

Next, Step 1602 calculates the modulation amount of the brightness. The brightness modulation amount is what is added to each pixel value as a noise, as described later, and is generated in this Step. The brightness modulation amount dY is calculated according to a following calculating formula using the above-calculated brightness value Y1.

$$dY=0 (Y1 \geq Ys)$$

$$dY=Yb \times (1-Y1/Ys)(Y1 \leq Ys) \qquad (3)$$

Figures 17, 18:
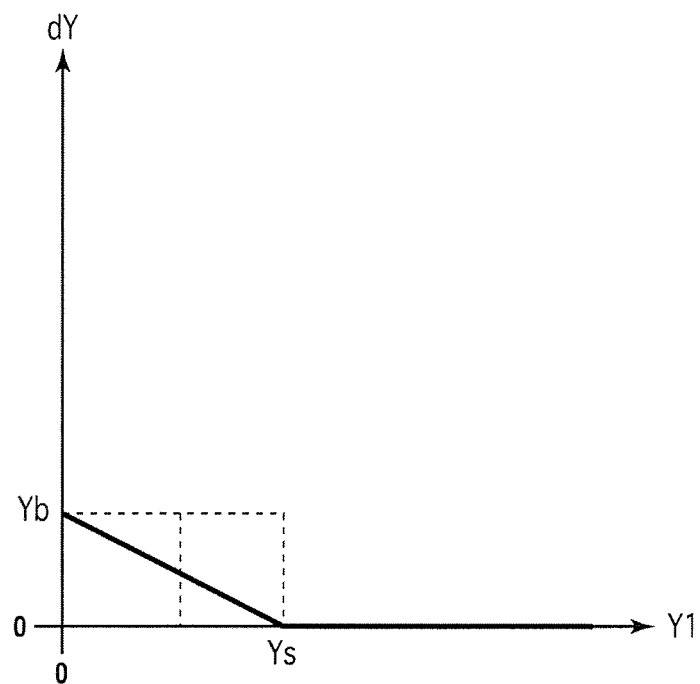
FIG. 17 is a graph illustrating a relation of a brightness modulation amount calculated in the second embodiment.
FIG. 18 is a diagram showing a two-dimensional array of each pixel of a brightness modulation sign for the second embodiment.

FIG. 17 is a graph showing the relation of the above formula (3). In FIG. 17, similarly to FIG. 12 of the first embodiment, the horizontal axis represents a part of the range from the lowest brightness 0 to the maximum brightness of the color gamut in the sRGB color space. In this embodiment, although the brightness modulation amount dY is also generated for the whitening, FIG. 17 does not show the relation of the calculation formula for the whitening. However, the brightness modulation amount dY for the whitening also can be calculated based on the same concept as that of the formula (3), as can be seen from the following description.

In the formula (3) and FIG. 17, Ys represents a value at which the brightness modulation is started in the blacking processing. Yb represents a brightness value reduced to have the brightness 0 in the blacking processing and Yb in this embodiment is a brightness obtained by an RGB value read by the MFP apparatus when the MFP apparatus scans a solid black printed by the MFP apparatus itself. As a result, a printing result retaining the density of the so-called solid black can be obtained in repeated copy operations.

It is noted that the "a" shown in FIG. 12 according to the first embodiment corresponds to Ys and L*Bk corresponds to Yb. The respective values of Ys and Yb can be set depending on an input/output characteristic of a printing apparatus for carrying out the present invention such as the MFP apparatus. For example, in the case of an apparatus that cannot provide a stable printing density or scan data, Ys and Yb can be set to be high. Alternatively, the formula (3) may not directly use Ys and Yb used in the brightness modulation processing but may use a margin.

Next, Step 1603 calculates the brightness modulation sign. Specifically, Step 1603 calculates a modulation sign value F for determining whether an object pixel is subjected to the modulation (+) for adding brightness or the modulation (−) for subtracting brightness. In this embodiment, when the coordinates of the object pixel are that "the coordinate x and the coordinate y are both an even value" or when the coordinates of the object pixel are that "the coordinate x and the coordinate y are both an odd value", F=+ is established and cases other than the above cases are subjected to F=−1. As shown in FIG. 18, in the two-dimensional pixel array, the respective pixels in the column direction and the row direction are alternately subjected to addition and subtraction of brightness.

Step 1604 modulates the brightness. Specifically, based on the above-calculated brightness modulation amount dY, brightness modulation sign F, and brightness value Y1, the following calculating formula is used to calculate a modulated brightness Y' (8 bit).

$$Y'=Y1+dY \times F/255 \qquad (4)$$

Finally, Step 1605 calculates a pixel value after the brightness modulation. Specifically, based on the above-calculated brightness Y' and the pixel value RGB relating to the calculation thereof, the pixel value R'G'B' after the modulation is calculated by the following calculating formula.

$$R'=Y'+1.371 \times (0.511 \times R-0.428 \times G-0.083 \times B)$$

$$G'=Y'-0.698 \times (-0.172 \times R-0.339 \times G-0.336 \times B)-0.336 \times (0.511 \times R-0.428 \times G-0.083 \times B)$$

$$B'=Y'+1.732 \times (-0.172 \times R-0.339 \times G-0.336 \times B) \qquad (5)$$

By the above processing, with regards to an object pixel in an image region such as a photograph and having the brightness to be subjected to the blacking processing, noise proportional to the modulation amount depending on the brightness value originally owned by the pixel is used to increase or decrease the brightness.

FIGS. 19A to 19D are views illustrating how to modulate a gradation image of a continuous tone with respect to the blacking processing.

Figure 19A:
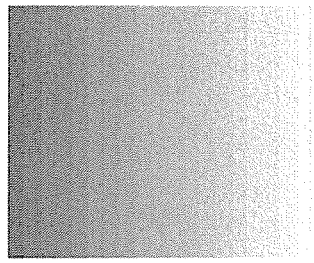
FIGS. 19A to 19D are views showing how to modulate a gradation image of a continuous gray scale by the blacking processing in the second embodiment.

FIG. 19A shows a gradation image before modulation. From the left side to the right side in FIG. 19A, the gradation from black to gray is formed. When this image is subjected to the modulation processing, an image shown in FIG. 19C is obtained. Since a bright region that is not a blacking region has zero modulation amount, this region directly retains the gradation shown in FIG. 19A. However, pixels of a blacking region are modulated so that a pixel brighter than the original pixel value and a pixel darker than the original pixel value are alternately arranged to form a checkered pattern. The pixel brighter than the original pixel value has a brightness that is brighter than the brightness Yb which is completely lost by the blacking and thus can retain the original gradation even when being subjected to the blacking.

Figure 19B:
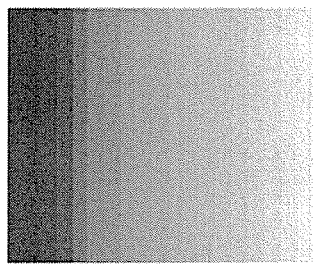
Figure 19C:
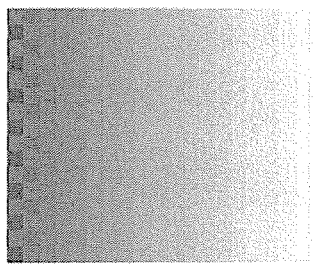
Figure 19D:
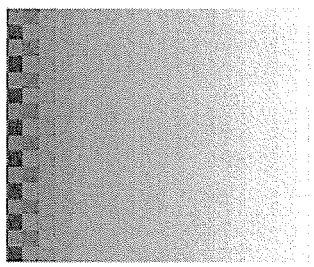

FIGS. 19B and 19D show the result of subjecting the images shown in FIGS. 19A and 19C to the blacking processing, respectively. As shown in FIG. 19B, the blacking processing converts colors from the leftmost tone to the third tone to black (the same color), and thus the gradation characteristic in the vicinity of black is lost. On the other hand, as can be seen from FIG. 19D, a part of the checkered pattern is converted to black and a part thereof is converted to gray brighter than black to entirely maintain the gradation characteristic.

Figure 20A:
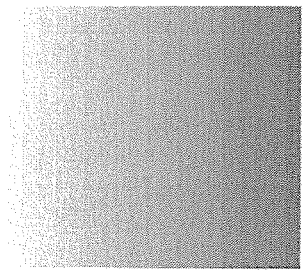
FIGS. 20A to 20D are views showing how to modulate a gradation image of a continuous gray scale by the whitening processing in the second embodiment.
Figure 20B:
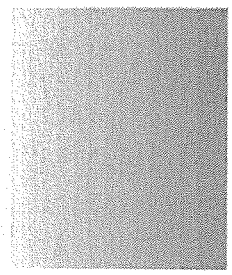
Figure 20C:
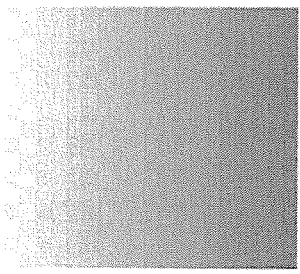

The same effect also can be obtained with respect to the whitening processing. FIGS. 20A to 20C show how to modulate a gradation image of a continuous tone with respect to the whitening processing.

Figure 20D:
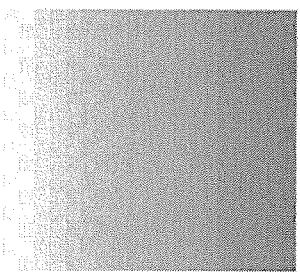

FIG. 20A shows a gradation image before the modulation. In FIG. 20A, gradation from white at the left side to gray at the right side is formed. When this gradation image is subjected to the modulation processing, an image as shown in FIG. 20C is obtained. Since a dark region that is not a whitening region has zero modulation amount, the gradation shown in FIG. 20A is directly retained. However, pixels in the whitening region are modulated to form a checkered pattern in which a pixel brighter than the original pixel value and a dark pixel are alternately arranged. A pixel brighter than the original pixel value has a brightness brighter than the brightness Yw that is completely lost by the whitening operation and thus can retain the original gradation even when being subjected to the whitening operation. FIGS. 20B and 20D show the result of subjecting the images shown in FIGS. 20A and 20C to the whitening processing, respectively. As shown in FIG. 20B, the whitening processing converts colors from the first to the third tone from the left to white (the same color), thus the gradation characteristic in the vicinity of white is lost. On the other hand, as shown in FIG. 20D, a part of the checkered pattern is converted to white and a part thereof is converted to gray darker than white, thereby retaining the entire gradation characteristic.

As described above, an image for which the dispersion is once reduced by the smoothing can be subjected to the gradation adjustment processing according to this embodiment so that a pixel influenced by the blacking or the whitening processing can be adjusted so that the color dispersion is enlarged in positive and negative directions. As a result, the number of pixels mapped to a black point or white point by the subsequent gamut compression can be reduced while maintaining the entire brightness. As a result, the entire predetermined region, which is a collection of these pixels, can be prevented from having a lost gradation characteristic by the blacking or whitening.

It is noted that this embodiment clips a signal value lower than 0 or equal to or higher than 255. Thus, the total brightness of the entire image may change due to the clipping before and after the modulation. Specifically, a negative brightness due to the modulation for a dark part may be clipped to zero. Although this zero brightness may be directly used if the total brightness must not be stored, the following procedure may be used if the total brightness must be stored. Specifically, a value corresponding to the brightness cut off when the brightness was clipped may be retained and may be added when another pixel is modulated. As a result, after the apparatus for carrying out the present invention performs the brightness modulation processing, a brightness histogram may be taken for an image for example so that, when a correction or image processing is performed to use the average value to perform some processing for example, the present invention can be prevented from having an influence on the result of the correction or image processing.

When the storage of the brightness is not intended, the modulation sign value F also may be always positive. In this case, a formula for calculating dY may be considered by which a magnitude relation of Y' of each pixel can retain, before and after the modulation, the original magnitude relation of Y.

Other Embodiments

It is noted that the present invention is not limited to the gamut compression of the above-described embodiment. For example, the present invention also can be applied to any other gamut mappings where the shape of the color gamut of an input color space is different from the shape of the color gamut of a output color space and the gradation of the input color space is compressed.

In the application of the present invention, the term "smoothing" can be interpreted as including any processing for averaging pixel values, as is clear from the above description.

Although the respective embodiment as described above relates to a case where the image processing of the present invention is carried out by a multi-functional printer, the present invention is not limited to this case. For example, the respective image processing as described above of the present invention also can be carried out by a personal computer. Alternatively, the respective image processing as described above of the present invention also can be carried out by a printer having only a general printing function. The respective apparatuses for carrying out these image processing constitute the image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2007-093552, filed Mar. 30, 2007, which is hereby incorporated by reference herein in its entirety.

What is claimed is:

1. An image processing apparatus that executes processing of image data that are composed of data representing gradation of each pixel, the image data being used for printing by a printer, the apparatus comprising:
    a smoothing unit constructed to execute smoothing processing of the image data;
    a gradation adjustment unit constructed to adjust gradation of the image data that has been smoothed by the smoothing unit; and
    a color conversion unit constructed to execute conversion processing of the image data that has been adjusted by the gradation adjustment unit,
    wherein the gradation adjustment unit includes processing that, with respect to a color which is converted into a color having a blacking lightness, and which is reproduced as a black in a printer gamut by the color conversion unit, converts a color of lightness having lower lightness than the blacking lightness into a color of lightness within a predetermined range including a color of lightness equal to or higher than the blacking lightness, each color of lightness within the predetermined range corresponding to a different color of lightness having the lower lightness.

2. An image processing apparatus that executes processing of image data that are composed of data representing gradation of each pixel, the image data being used for printing by a printer, said apparatus comprising:
    a smoothing unit constructed to execute smoothing processing of the image data;
    a gradation adjustment unit constructed to adjust gradation of the image data that has been smoothed by said smoothing unit; and
    a color conversion unit constructed to execute conversion processing of the image data that has been adjusted by said gradation adjustment unit,
    wherein the gradation adjustment unit includes processing that, with respect to a color which is converted into a color having a whitening lightness, and which is reproduced as a white of a printing medium by the color conversion unit, converts a color of lightness having higher lightness than the whitening lightness into a color of lightness within a predetermined range including a color of lightness equal to or lower than the whitening lightness, each color of lightness within the predetermined range corresponding to a different color of lightness having the higher lightness.

3. The image processing apparatus as claimed in claim 1, wherein the gradation adjustment unit, for colors having lightness in the predetermined range including the blacking lightness, makes a difference of pixel values between pixels in the predetermined range greater so as to adjust the gradation of image data.

4. The image processing apparatus as claimed in claim 2, wherein the gradation adjustment unit, for colors having lightness in the predetermined range including the whitening lightness, makes a difference of pixel values between pixels in the predetermined range greater so as to adjust the gradation of image data.

5. An image processing method of executing processing of image data that are composed of data representing gradation of each pixel, the image data being used for printing by a printer, the method comprising:
- a smoothing step of executing smoothing processing of the image data;
- a gradation adjustment step of adjusting gradation of the image data that has been smoothed in the smoothing step; and
- a color conversion step of executing processing of the image data that has been adjusted in the gradation adjustment step,
- wherein the gradation adjustment step includes processing that, with respect to a color which is converted into a color having a blacking lightness, and which is reproduced as a black in a printer gamut in the color conversion step, converts a color of lightness having lower lightness than the blacking lightness into a color of lightness within a predetermined range including a color of lightness equal to or higher than the blacking lightness, each color of lightness within the predetermined range corresponding to a different color of lightness having the lower lightness.

6. A program stored on a non-transitory computer readable medium, the program causing a computer to function as an image processing apparatus that executes processing of image data that are composed of data representing gradation of each pixel, the image data being used for printing by a printer, the apparatus comprising:
- a smoothing unit constructed to execute smoothing processing of the image data;
- a gradation adjustment unit constructed to adjust gradation of the image data that has been smoothed by the smoothing unit; and
- a color conversion unit constructed to execute conversion processing of the image data that has been adjusted by the gradation adjustment unit,
- wherein the gradation adjustment unit includes processing that, with respect to a color which is converted into a color having a blacking lightness, and which is reproduced as a black in a printer gamut by the color conversion unit, converts a color of lightness having lower lightness than the blacking lightness into a color of lightness within a predetermined range including a color of lightness equal to or higher than the blacking lightness, each color of lightness within the predetermined range corresponding to a different color of lightness having the lower lightness.

7. An image processing method of executing processing of image data that are composed of data representing gradation of each pixel, the image data being used for printing by a printer, the method comprising:
- a smoothing step that executes smoothing processing of the image data;
- a gradation adjustment step that adjusts gradation of the image data that has been smoothed in the smoothing step; and
- a color conversion step that executes conversion processing of the image data that has been adjusted in the gradation adjustment step,
- wherein the gradation adjustment step includes processing that, with respect to a color which is converted into a color having a whitening lightness, and which is reproduced as a white of a printing medium in the color conversion step, converts a color of lightness having higher lightness than the whitening lightness into a color of lightness within a predetermined range including a color of lightness equal to or lower than the whitening lightness, each color of lightness within the predetermined range corresponding to a different color of lightness having the higher lightness.

8. A program stored on a non-transitory computer-readable medium, the program causing a computer to function as an image processing apparatus that executes processing of image data that are composed of data representing gradation of each pixel, the image data being used for printing by a printer, the apparatus comprising:
- a smoothing unit constructed to execute smoothing processing of the image data;
- a gradation adjustment unit constructed to adjust gradation of the image data that has been smoothed by the smoothing unit; and
- a color conversion unit constructed to execute conversion processing of the image data that has been adjusted by the gradation adjustment unit,
- wherein the gradation adjustment unit includes processing that, with respect to a color which is converted into a color having a whitening lightness, and which is reproduced as a white of a printing medium by the color conversion unit, converts a color of lightness having higher lightness than the whitening lightness into a color of lightness within a predetermined range including a color of lightness equal to or lower than the whitening lightness, each color of lightness within a predetermined range corresponding to a different color of lightness having the higher lightness.

9. An image processing apparatus comprising:
- a smoothing unit configured to execute smoothing processing of image data;
- a changing unit configured to change a value of a pixel in the image data that has been smoothed by the smoothing unit; and
- a color conversion unit configured to execute conversion processing for converting a color of pixel showing a color in a first color gamut and being in the image data the values of which have been changed by the changing unit, into a color in a second color gamut so that a color of pixel showing the color in the first color gamut which has lower lightness than a lightness of a predetermined color in the second color gamut and which shows a color in a region other than the second gamut is made to show the predetermined color,
- wherein said changing unit changes the value of the pixel in the image data that has been smoothed by the smoothing unit, so that the pixel, showing the color in the first color gamut which has lower lightness than the lightness of the predetermined color, in the image data that have been smoothed by the smoothing unit, is made to show the color in the second gamut.

10. The image processing apparatus as claimed in claim 9, wherein said changing unit changes the value of the pixel showing lower brightness than a predetermined brightness so as to make the color of the pixel showing lower brightness than a predetermined brightness show increased brightness.

11. The image processing apparatus as claimed in claim 9, wherein the predetermined color in the second color gamut is a color of a black point in the second color gamut.

12. An image processing apparatus comprising:
- a smoothing unit configured to execute smoothing processing of image data;
- a changing unit configured to change a value of a pixel in the image data that has been smoothed by the smoothing unit; and a color conversion unit constructed to execute conversion processing for converting a color of pixel showing a color in a first color gamut being in the image data the values of which have been changed by the changing unit, into a color in a second color gamut, so that a color of pixel showing the color in the first color gamut which has higher lightness than a lightness of a predetermined color in the second color gamut and which shows a color in a region other than the second gamut is made to show the predetermined color, wherein said changing unit changes the value of the pixel in the image data that has been smoothed by the smoothing unit, so that the pixel, showing the color in the first color gamut which has higher lightness than the lightness of the predetermined color, in the image data that have been smoothed by the smoothing unit, is made to show the color in the second gamut.

13. The image processing apparatus as claimed in claim 12, wherein said changing unit changes the value of the pixel showing higher brightness than a predetermined brightness so as to make the color of pixel showing lower brightness than a predetermined brightness show decreased brightness.

14. The image processing apparatus as claimed in claim 12, wherein the predetermined color in the second color gamut is a color of a white point in the second color gamut.

15. An image processing method comprising:
a smoothing step of executing smoothing processing of image data;
a changing step of changing a value of a pixel in the image data that has been smoothed by the smoothing step; and
a color conversion step of executing conversion processing for converting a color of pixel showing a color in a first color gamut and being in the image data the values of which have been changed by the changing step, into a color in a second color gamut so that a color of a pixel showing the color in the first color gamut which has lower lightness than a lightness of a predetermined color in the second color gamut and which shows a color in a region other than the second gamut is made to show the predetermined color, wherein said changing step changes the value of the pixel in the image data that has been smoothed by the smoothing step, so that the pixel, showing the color in the first color gamut which has lower lightness than the lightness of the predetermined color, in the image data that have been smoothed by the smoothing step, is made to show the color in the second gamut.

16. The image processing method as claimed in claim 15, wherein said changing step changes the value of the pixel showing lower brightness than a predetermined brightness so as to make the color of the pixel showing lower brightness than a predetermined brightness show increased brightness.

17. The image processing method as claimed in claim 15, wherein the predetermined color in the second color gamut is a color of a black point in the second color gamut.

18. An image processing method comprising:
a smoothing step of executing smoothing processing of image data;
a changing step of changing a value of a pixel in the image data that has been smoothed by the smoothing step; and
a color conversion step of executing conversion processing for converting a color of pixel showing a color in a first color gamut being in the image data the values of which have been changed by the changing step, into a color in a second color gamut, so that a color of pixel showing the color in the first color gamut which has higher lightness than a lightness of a predetermined color in the second color gamut and which shows a color in a region other than the second gamut is made to show the predetermined color, wherein said changing step changes the value of the pixel in the image data that has been smoothed by the smoothing step, so that the pixel, showing the color in the first color gamut which has higher lightness than the lightness of the predetermined color, in the image data that have been smoothed by the smoothing step, is made to show the color in the second gamut.

19. The image processing method as claimed in claim 18, wherein said changing step changes the value of the pixel showing higher brightness than a predetermined brightness so as to make the color of the pixel showing lower brightness than a predetermined brightness show decreased brightness.

20. The image processing method as claimed in claim 18, wherein the predetermined color in the second color gamut is a color of a white point in the second color gamut.

21. The image processing apparatus as claimed in claim 11, wherein said changing unit changes the value of the pixel showing lower brightness than a predetermined brightness so as to make the color of the pixel showing lower brightness than a predetermined brightness show a different color from the color of the black point in the second color gamut.

22. The image processing apparatus as claimed in claim 14, wherein said changing unit changes the value of the pixel showing lower brightness than a predetermined brightness so as to make the color of the pixel showing lower brightness than a predetermined brightness show a different color from the color of the white point in the second color gamut.

23. The image processing method as claimed in claim 17, wherein said changing step changes the value of the pixel showing lower brightness than a predetermined brightness so as to make the color of the pixel showing lower brightness than a predetermined brightness show a different color from the color of the black point in the second color gamut.

24. The image processing method as claimed in claim 20, wherein said changing step changes the value of the pixel showing lower brightness than a predetermined brightness so as to make the color of the pixel showing lower brightness than a predetermined brightness show a different color from the color of the white point in the second color gamut.

* * * * *